United States Patent [19]
Suzuki et al.

[11] Patent Number: 5,696,531
[45] Date of Patent: Dec. 9, 1997

[54] IMAGE DISPLAY APPARATUS CAPABLE OF COMBINING IMAGE DISPLAYED WITH HIGH RESOLUTION AND IMAGE DISPLAYED WITH LOW RESOLUTION

[75] Inventors: Katsunori Suzuki, Machida; Toshihiko Kumon, Hoi-Gun; Yoshikazu Ikenoue, Toyohashi, all of Japan

[73] Assignee: Minolta Camera Kabushiki Kaisha, Osaka, Japan

[21] Appl. No.: 226,411

[22] Filed: Apr. 12, 1994

Related U.S. Application Data

[63] Continuation of Ser. No. 831,373, Feb. 4, 1992, abandoned.

[30] Foreign Application Priority Data

Feb. 5, 1991 [JP] Japan ............................ 3-036804
Feb. 5, 1991 [JP] Japan ............................ 3-036805
Feb. 5, 1991 [JP] Japan ............................ 3-036806

[51] Int. Cl.$^6$ ............................................ G09G 5/00
[52] U.S. Cl. ..................... 345/132; 345/147; 345/202
[58] Field of Search ........................... 345/132, 127, 345/128, 129, 130, 131, 138, 147, 149, 152, 173, 179, 145, 146, 163, 202, 115, 118, 119; 395/128; 382/299

[56] References Cited

U.S. PATENT DOCUMENTS

| | | | |
|---|---|---|---|
| 4,517,658 | 5/1985 | Iida | 364/900 |
| 4,684,936 | 8/1987 | Brown | 340/721 |
| 4,800,379 | 1/1989 | Yeomans | 340/798 |
| 4,862,288 | 8/1989 | Sekiya | 358/298 |
| 5,125,043 | 6/1992 | Karlsson | 340/731 |
| 5,140,314 | 8/1992 | Standfield et al. | 340/723 |
| 5,142,616 | 8/1992 | Kellas et al. | 340/734 |
| 5,153,936 | 10/1992 | Morris et al. | 340/731 |
| 5,175,815 | 12/1992 | Wada | 345/132 |

*Primary Examiner*—Xiao Wu
*Attorney, Agent, or Firm*—Burns, Doane, Swecker & Mathis, LLP

[57] ABSTRACT

An image display apparatus according to the present invention includes an image data memory for storing image data to be displayed, an image plane for displaying an image, a low resolution image display unit for displaying an image based on image data on the image plane with low resolution, a mouse for designating a position in a particular region in the image plane, and a high resolution image display unit for displaying an image based on image data of the particular region designated by the mouse on the image plane with high resolution of a resolution level higher than the resolution level of the low resolution.

38 Claims, 19 Drawing Sheets

FRAME MEMORY

IMAGE DISPLAY APPARATUS CAPABLE OF COMBINING IMAGE DISPLAYED WITH HIGH RESOLUTION AND IMAGE DISPLAYED WITH LOW RESOLUTION

This application is a continuation of application Ser. No. 07/831,373, filed Feb. 4, 1992, now abandoned.

BACKGROUND OF THE INVENTION

1. Field of the Invention

The present invention relates to image display, and, more particularly, to an image display system and an apparatus capable of displaying a part to be noted definitely on a large image plane.

2. Description Of the Related Art

Recently, there are increasing requests for image display with a large image plane.

Conventionally, a CRT (Cathode-Ray Tube) having a large surface of a display tube is used for implementing a large image plane in a CRT display apparatus using a CRT, for example.

In addition, in order to display an image on a particularly large image plane, a projection display apparatus including a screen to be an image plane, a rear projection type liquid crystal panel, and a light source for projecting an image displayed on the liquid crystal panel onto the screen is used.

In order to make an image plane further larger in such a projection display apparatus, a screen is made larger according to the size of the image plane, and an image displayed on a liquid crystal panel is projected onto the screen at higher magnification.

However, if an image plane becomes larger in any of the above-described display apparatuses and the number of display pixels (the number of dots) in a longitudinal direction is the same as that in a lateral direction, the space between display pixels becomes larger. Accordingly, the apparent resolution of an image is lowered, and the definition of the image is lowered for a person who is viewing the image plane.

Therefore, it is necessary to raise horizontal and vertical scanning frequencies in a conventional CRT display unit in order to implement display on a large image plane and with high resolution.

However, high-grade technique and high cost are required for raising a scanning frequency of an image plane, and there is an upper limit to a scanning frequency, so that resolution is limited.

In addition, in a conventional projection display apparatus, it is necessary to increase the number of display pixels of a rear projection type liquid crystal panel and the luminous intensity of a light source to implement display on a large image plane and with high resolution, so that it also requires a high cost.

Specifically, both the size of an image plane and the number of display dots are increased in order to implement a large image plane and high resolution in any cases, so that the cost of a display apparatus is largely increased.

On the other hand, it is also possible to display an enlarged image of a part to be noted, which is to be viewed in detail, on an image plane without making the image plane larger; however, although it is possible to view the image of the part to be noted in detail in this case, the region of the image displayed on the image plane becomes smaller, and it is impossible to look over the whole of the original image or a large region with one image plane.

SUMMARY OF THE INVENTION

An object of the present invention is to efficiently enhance the definition of an image in an image display apparatus.

Another object of the present invention is to economically enhance the definition of an image in an image display apparatus.

Still another object of the present invention is to enhance the definition of an image as well as to achieve suitable brightness of an image in an image display apparatus.

A further object of the present invention is to enhance operability of image display in an image display apparatus.

In order to achieve the above objects, an image display apparatus according to the present invention includes image data storing means for storing image data to be displayed, an image plane for displaying an image, low resolution image display means for displaying an image based on image data on the image plane with low resolution, position designating means for designating a position of a particular region in the image plane, high resolution image display means for displaying on the image plane an image based on image data of the particular region designated by the position designating means with high resolution of a resolution level higher than the resolution level of the low resolution.

An image of a particular region and an image of a region other than the particular region are displayed with different resolution in the image display apparatus implemented as described above, so that definition of an image is efficiently enhanced, and the cost is lowered.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
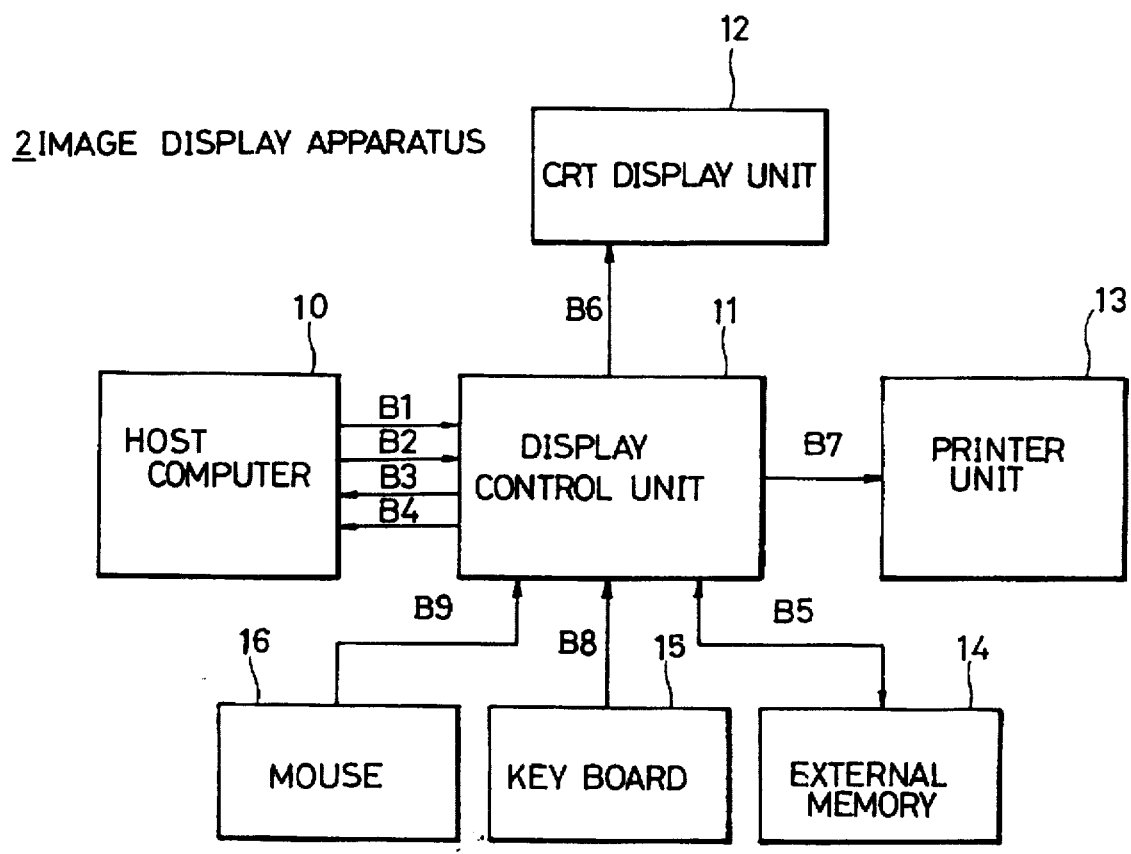
FIG. 1 is a block diagram of an image display apparatus according to an embodiment of the present invention.

FIG. 1 is a block diagram illustrating an image display apparatus 2 according to the present invention.

Image display apparatus 2 includes a host computer 10, a display control unit 11, a CRT display unit 12, a printer unit 13, an external memory 14, a keyboard 15, and a mouse 16.

Host computer 10 executes various applications and provide print data or image data (hereinafter referred to as "image data") to be displayed or printed through a signal line B1 or B2.

Display control unit 11 edits the image data provided through signal line B1 of host computer 10 as an image on an internal memory of a bit-map system and performs partial high resolution display processing on the image data on the basis of an operation input signal from keyboard 15 or mouse 16. The processed image data is provided to CRT display unit 12 or printer unit 13, and an image of it is displayed or printed. It is also possible to store the image data in external memory 14. Details of the partial high resolution display processing will be described later.

On the other hand, the image data provided through signal lines B2 of host computer 10 is applied to CRT display unit 12 and displayed without being processed. This image data is mainly for an image for operation which displays an execution result of a program in host computer 10.

During display of the image data provided through signal line B2, the operation input signal from keyboard 15 and mouse 16 is provided intact through a signal line B3 to host computer 10 without being processed in display control unit 11 and is used for a process of application in host computer 10.

In this specification, a mode in which partial high resolution display processing is performed on image data provided through signal line B1 is hereinafter referred to as a partial high resolution mode, and a mode in which image data provided through signal line B2 is directly displayed is hereinafter referred to as a direct display mode.

CRT display unit 12 displays image data transmitted through a signal line B6 onto an image plane 12a. Signal line B6 includes a brightness signal, a horizontal sweep signal, and a vertical sweep signal.

Printer unit 13 prints an image on a piece of paper on the basis of image data transmitted through a signal line B7.

External memory 14 includes an auxiliary memory unit such as a hard disk unit, a floppy disk unit, or the like, for example.

Although keyboard 15 and mouse 16 are for operating display control unit 11, they can also serve for operating host computer 10.

Mouse 16 is provided with two setting buttons 16a, 16b used in common for operating both of display control unit 11 and host computer 10 and a switching button 16c used exclusively in display control unit 11 for switching the display mode.

Figure 2:
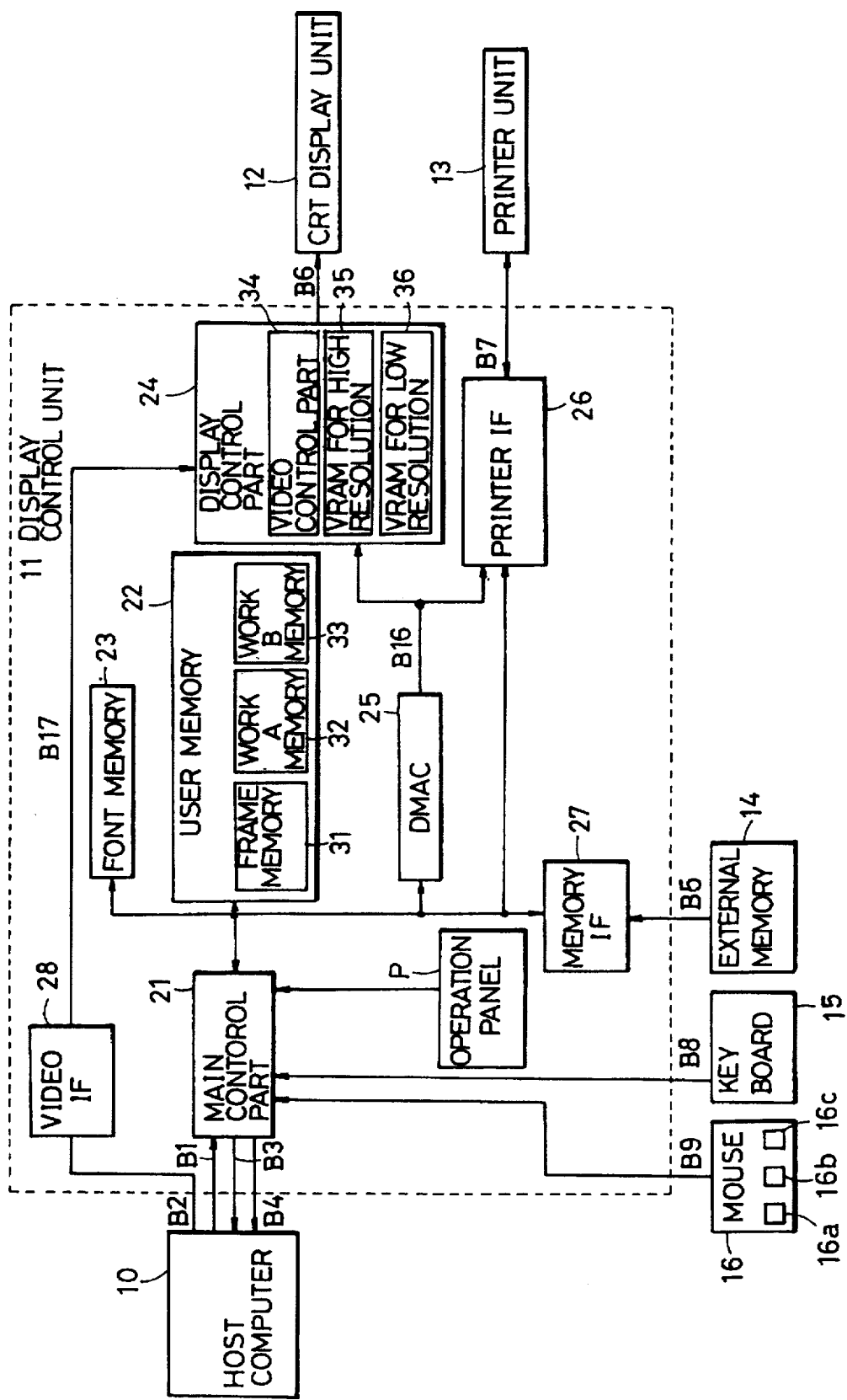
FIG. 2 is a block diagram illustrating a structure of the display control unit in FIG. 1.

FIG. 2 is a block diagram illustrating specific structure of display control unit 11.

Display control unit 11 includes a main control part 21, a user memory 22, a font memory 23, a display control part 24, a DMAC 25, printer IF 26, a memory IF 27, a video IF 28, and so forth.

Main control part 21, which includes a MPU (Micro Processor Unit) and so forth, analyzes image data transmitted through signal line B1, expands it as an image in a frame memory 31 using font data, and also executes partial high resolution display processing and other processing.

User memory 22 is a memory capable of reading and writing and is provided with frame memory 31, a work A memory 32, and a work B memory 33.

Font memory 23 is a memory storing font data.

A video control part 34, a VRAM 35 for high resolution, and a VRAM 36 for low resolution are provided in display control part 24 for executing partial high resolution display processing.

DMAC 25 controls data transfer from frame memory 31 to work A memory 32 or VRAM 35 for high resolution and data transfer between other various memories.

In addition, an operation panel P is connected to main control part 21 for adjusting the ratio of the average brightness (hereinafter merely referred to as "brightness" in some cases) of a high resolution display region to the average brightness of the low resolution display region in a partial high resolution mode.

Printer IF 26, memory IF27, and video IF 28 are interfaces between display control unit 11 and printer unit 13, external memory 14, and host computer 10.

Figure 5A:
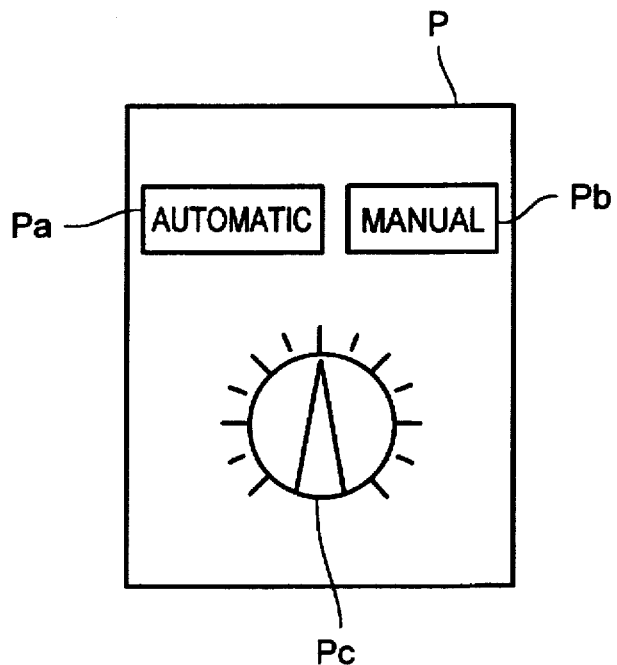
FIG. 5 is a front view of an operation panel in FIG. 2.
Figure 5B:
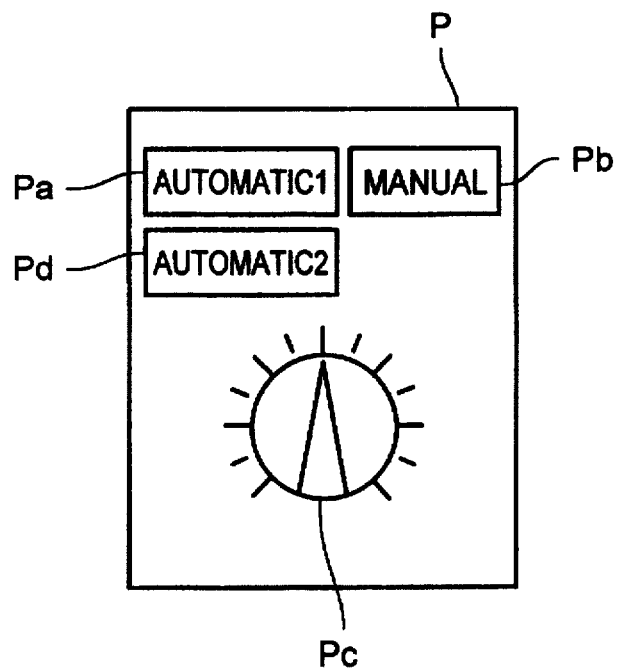

FIG. 5(a) is a front view according to an example of operation panel P, and FIG. 5(b) is a front view according to another example of operation panel P.

In FIG. 5(a), an automatic adjustment key Pa is an operation key for setting brightness of a part displayed as one pixel in a low resolution display region to a predetermined value and equalizing the average brightness of the low resolution display region with the average brightness of a high resolution display region.

A manual adjustment key Pb is a key for manually adjusting the ratio of the average brightness of the low resolution display region to the average brightness of the high resolution display region, and, if manual adjustment key Pb is operated, the brightness of the low resolution display region is set to a value corresponding to a predetermined value of a dial Pc.

In FIG. 5(b), an automatic 1 adjustment key Pa has the same function as the function of the automatic adjustment key Pa in FIG. 5(a). An automatic 2 adjustment key Pd has a function of fixing an output of an amplifying circuit 62d in FIG. 4 to 0. This causes the quantity of light corresponding to one pixel to be the same whether it is in a high resolution part or in a low resolution part in an image plane, so that the average brightness of the low resolution part is relatively lowered, and the high resolution part comes to be highlighted.

Main control part 21 transmits a signal for adjusting the brightness of the low resolution display region to display control part 24 on the basis of a state predetermined by operation panel P.

Now, partial high resolution display processing by display control unit 11 will be described.

Figure 6:
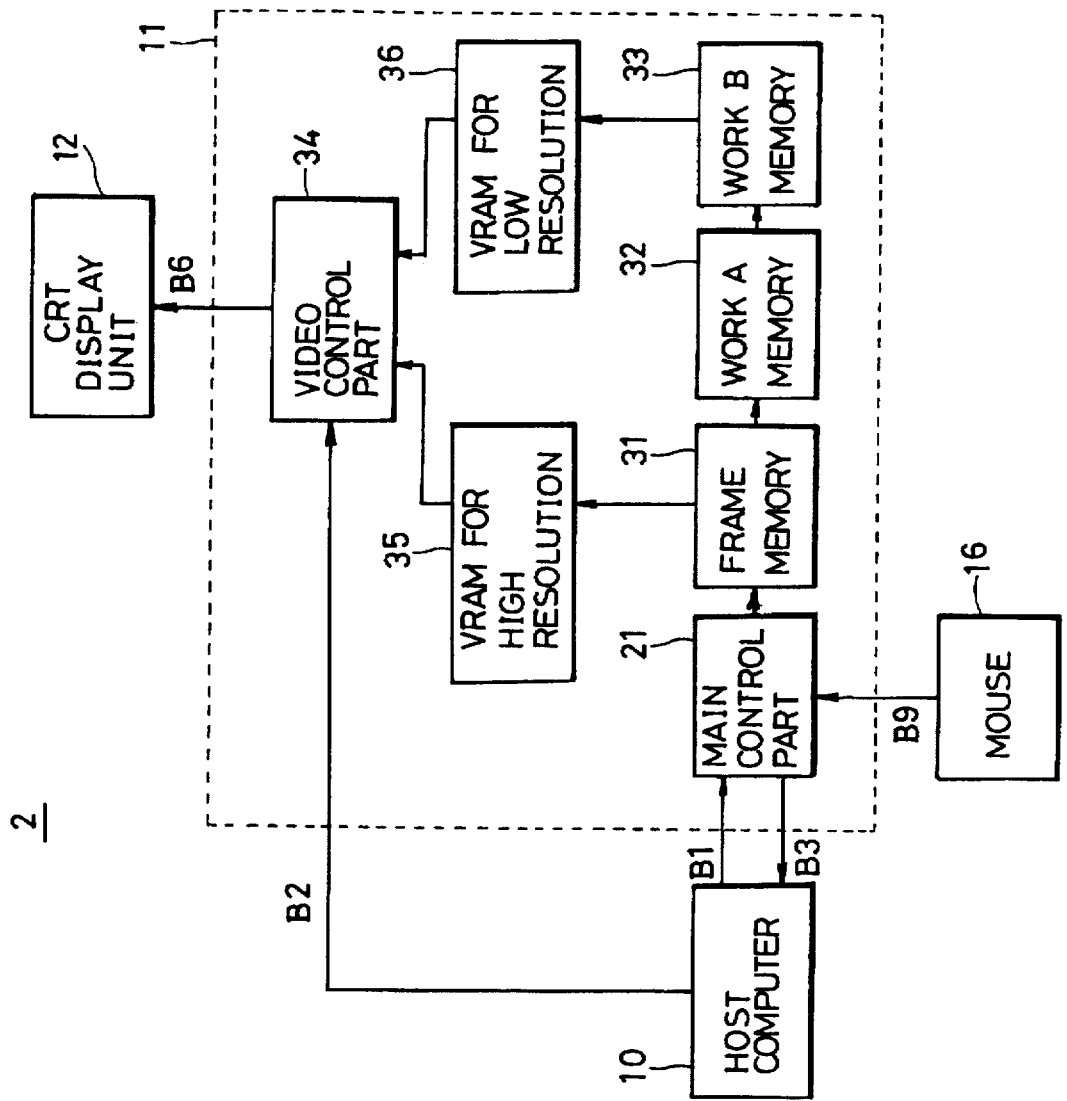
FIG. 6 is a diagram illustrating flow of image data in the image display apparatus in FIG. 1.

FIG. 6 is a diagram illustrating flow of image data in image display apparatus 2, and FIG. 7 is a diagram for explaining partial high resolution display processing in image display apparatus 2.

Image data provided through signal line B1 of host computer 10 is once stored in a frame memory 31 by main control part 21.

Figure 7A:
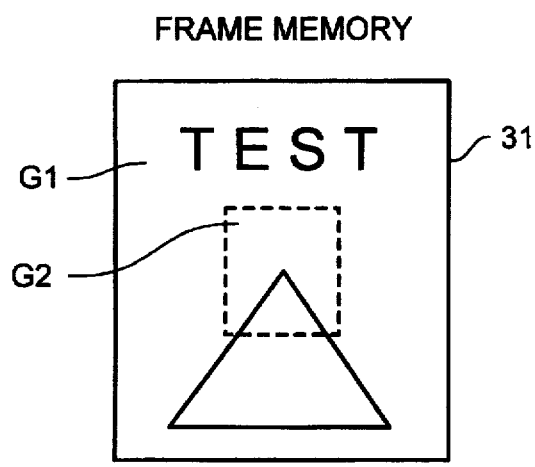
FIG. 7 is a diagram for explaining partial high resolution display processing in the image display apparatus in FIG. 1.

In an example illustrated in FIG. 7(a), image data for displaying characters of "TEST" in an upper central part of an image plane and a triangular graphic form in a lower central part of the image plane is stored in frame memory 31.

In addition, a rectangular region in an approximately central position surrounded by a dotted line is designated as a high resolution display region G2 in frame memory 31. High resolution display region G2 can be designated in any position on the image plane by mouse 16. The region other than high resolution display region G2 is a low resolution display region G1.

Figure 7B:

First, image data stored in frame memory 31 is compressed into a size which can be displayed on the image plane of CRT display unit 12 as illustrated in FIG. 7(b) and transmitted to work A memory 32 for display of low resolution display region G1 (low resolution display). This compression transfer processing requires a relatively long time (for example, several hundreds ms), so that it is executed repeatedly on a longer predetermined cycle.

Figure 7C:
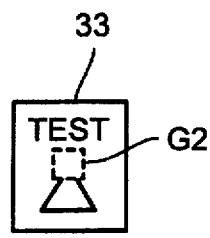

Then, as illustrated in FIG. 7(c), the image data in work A memory 32 is transferred (copied) to a work B memory 33 with a region overlapping with high resolution display region G2 being masked.

As long as the content of frame memory 31 is not changed, compression transfer processing from frame memory 31 to work A memory 32 is not executed, and the processing of transferring the content of work A memory 32 to work B memory 33 with a designated high resolution display region G2 being masked is repeated.

Figure 7D:
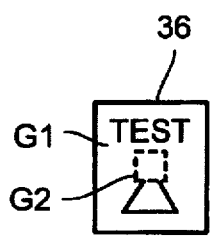

Then, as illustrated in FIG. 7(d), the content of work B memory 33 is transferred to VRAM 36 for low resolution.

Figure 7E:
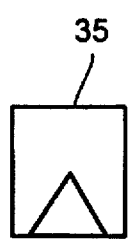

On the other hand, image data in high resolution display region G2 of the image data stored in frame memory 31 is transferred to VRAM 35 for high resolution as illustrated in FIG. 7(e) for display of high resolution display region G2 (high resolution display).

Figure 7F:
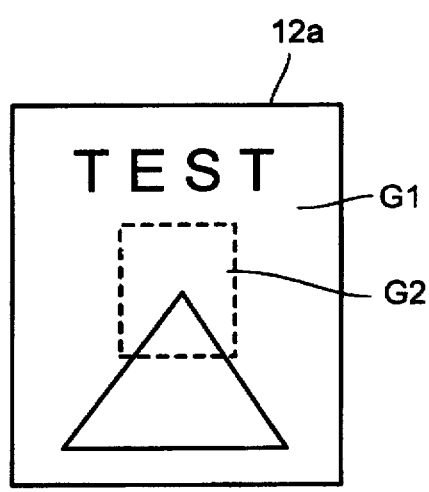

The image data in low resolution display region G1 and the image data in high resolution display region G2 are combined by a video control part 34 and, as illustrated in FIG. 7(f), displayed on image plane 12a of CRT display unit 12 by partial high resolution display.

Image data through signal line B2 of host computer 10 is displayed intact on image plane 12a by video control part 34.

Next, combining processing by video control part 34 will be described.

FIG. 8 is a diagram illustrating a sweep signal of CRT display unit 12 in video control part 34.

Video control part 34 scans image plane 12a so as to display low resolution display region G1 and high resolution display region G2 alternately with respect to time.

Figure 8A:
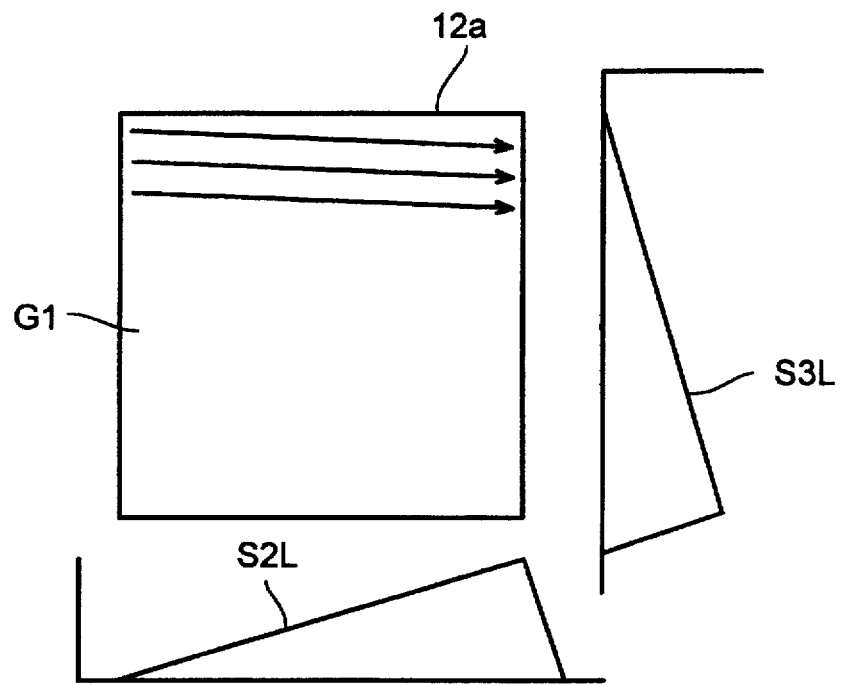
FIG. 8 is a diagram illustrating a sweep signal in a CRT display unit in an video control part in FIG. 2.

Specifically, in performing low resolution display on image plane 12a, as illustrated in FIG. 8(a), the whole of image plane 12a is scanned in a horizontal direction and a vertical direction by a horizontal sweep signal S2L and a vertical sweep signal S3L, and brightness modulation is performed on the basis of image data read from VRAM 36 for low resolution.

Figure 8B:
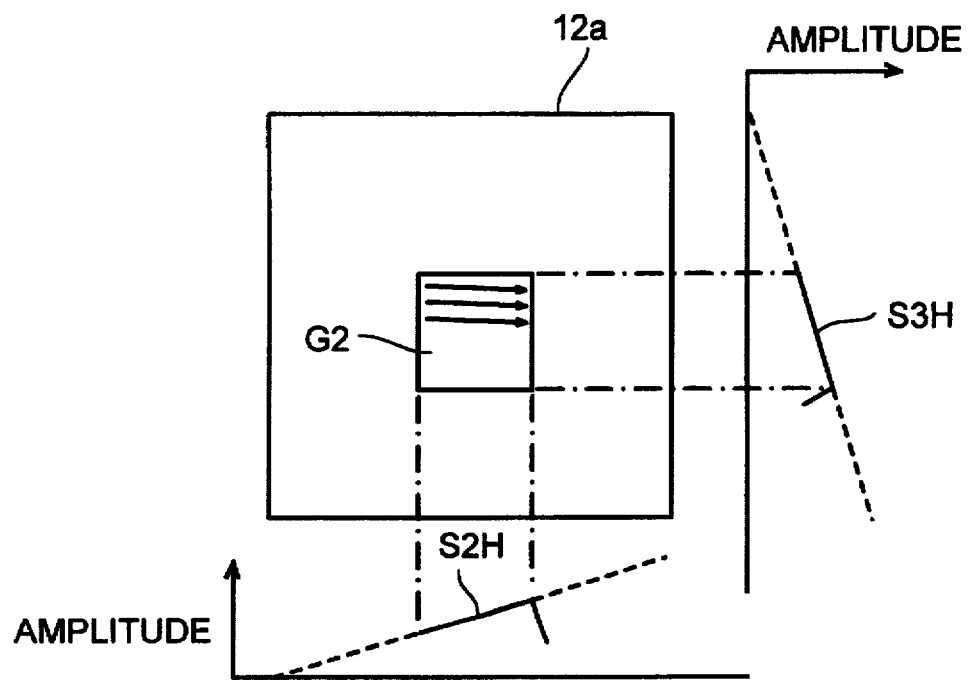

In performing high resolution display on image plane 12a, as illustrated in FIG. 8(b), high resolution display region G2 is scanned by a horizontal sweep signal S2H and a vertical sweep signal S3H which have an amplitude compressed to correspond to the size of high resolution display region G2 and are given an offset value (bias value) to correspond to the position (upper left hand) of high resolution display region G2. Brightness modulation is performed on the basis of image data read from VRAM 35 for high resolution.

The respective frequencies of the horizontal sweep signal, the vertical sweep signal, and bright modulation in the low resolution display are the same as those in the high resolution display. Specifically, although the number of pixels in the low resolution display and the number of pixels in the high resolution display are approximately the same, high resolution display region G2 is smaller than the whole region of image plane 12a. Therefore, the pixel density in high resolution display region G2 becomes higher than that in low resolution display region G1, and high resolution display is performed.

Accordingly, as high resolution display region G2 is made smaller, the display density can be made higher. In other words, high resolution display region G2 becomes smaller according to the highness of the display density. However, actually, there is a limit to density which can be displayed by resolving power of CRT display unit 12 itself.

In addition, the pixel density in low resolution display region G1 and that in high resolution display region G2 are different, so that, in a case where the brightness of one pixel is the same, the average brightness of the image in high resolution display region G2 becomes higher.

Therefore, the ratio of the brightness of low resolution display region G1 to that of high resolution display region G2 is automatically adjusted to display an image with uniform brightness, and the ratio can be manually adjusted.

Next, a display mode of CRT display unit 12 will be described.

FIG. 9 is a diagram illustrating a state of an image displayed on image plane 12a on CRT display unit 12.

Figure 9B:
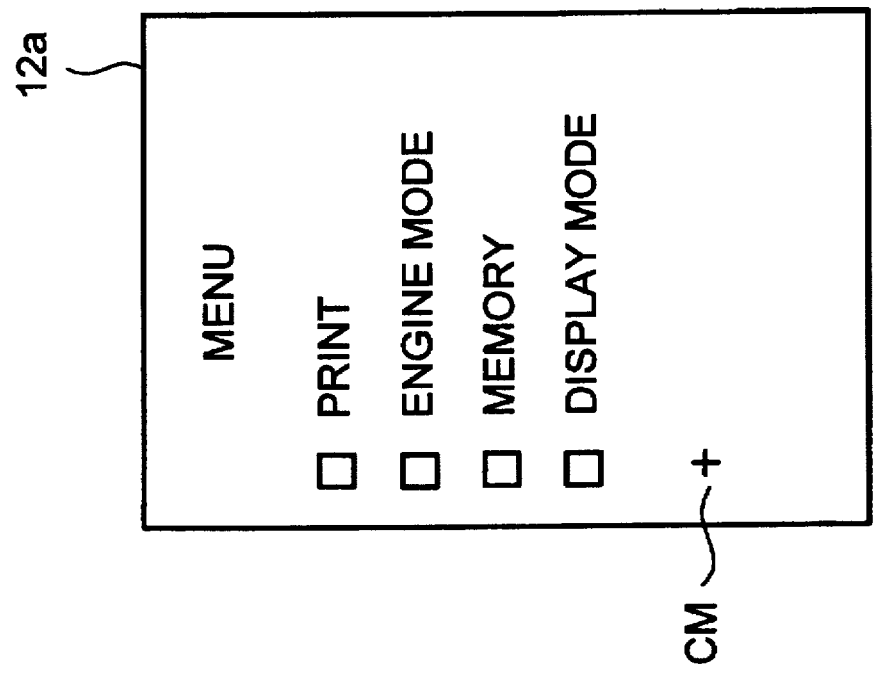
FIG. 9 is a diagram illustrating a state of an image displayed on an image plane in the CRT display unit in FIG. 2.
Figure 9A:
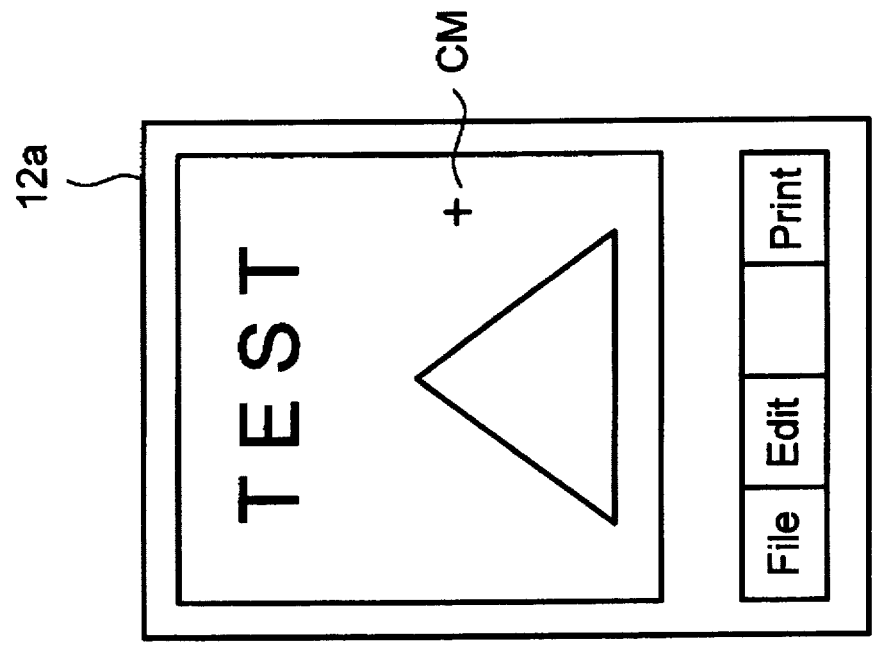

FIG. 9(a) illustrates a state of a process menu of image display unit 2 being displayed.

In this state, high resolution display region G2 is not displayed on image plane 12a, and the whole becomes low resolution display region G1. A cursor mark CM is displayed on image plane 12a for selecting a menu and moved by mouse 16.

By selecting a menu on image plane 12a, activation of printer unit 13, switching of the mode of an engine in printer unit 13, or the like is performed, and, by selecting a display mode, switching between a direct display mode and a partial high resolution mode is performed.

In this state, an operation input signal from keyboard 15 and mouse 16 is not provided to host computer 10.

FIG. 9(b) is a diagram illustrating a state of an image for operation of host computer 10 by the direct display mode being displayed.

In this state, image data for display differs according to an application executed in host computer 10, and the resolution becomes the same over the whole image plane.

In addition, in this state, an operation input signal from keyboard 15 and mouse 16 is not processed in display control unit 11, so that cursor mark CM is controlled by an application program of host computer 10.

A partial high resolution display image plane in the partial high resolution mode is as illustrated in the above-described FIG. 7(f).

In this state, as described above, a low resolution display region G1 and a high resolution display region G2 are provided on image plane 12a, and the position of high resolution display region G2 is determined by mouse 16.

The partial high resolution mode is selected when the state (the state of printing) of an image to be printed by printer unit 13 is verified in advance on the image plane, for example.

Specifically, the display density of CRT display unit 12 is low as compared with the printing density of printer unit 13, so that it is not possible to verify the state of a fine part of an image in a case where normal display is performed by CRT display unit 12 prior to printing by printer unit 13. It is possible to display definitely a part to be verified or a part to be noted and to display simultaneously and verify the whole image by selecting the partial high resolution mode and designating a part to be verified or the part to be noted in a high resolution display region G2.

Display onto CRT display unit 12 is performed asynchronously with editing of image data to be printed by printer unit 13.

Now, an example of circuitry of display control part 24 and its operation will be described.

Figure 3:
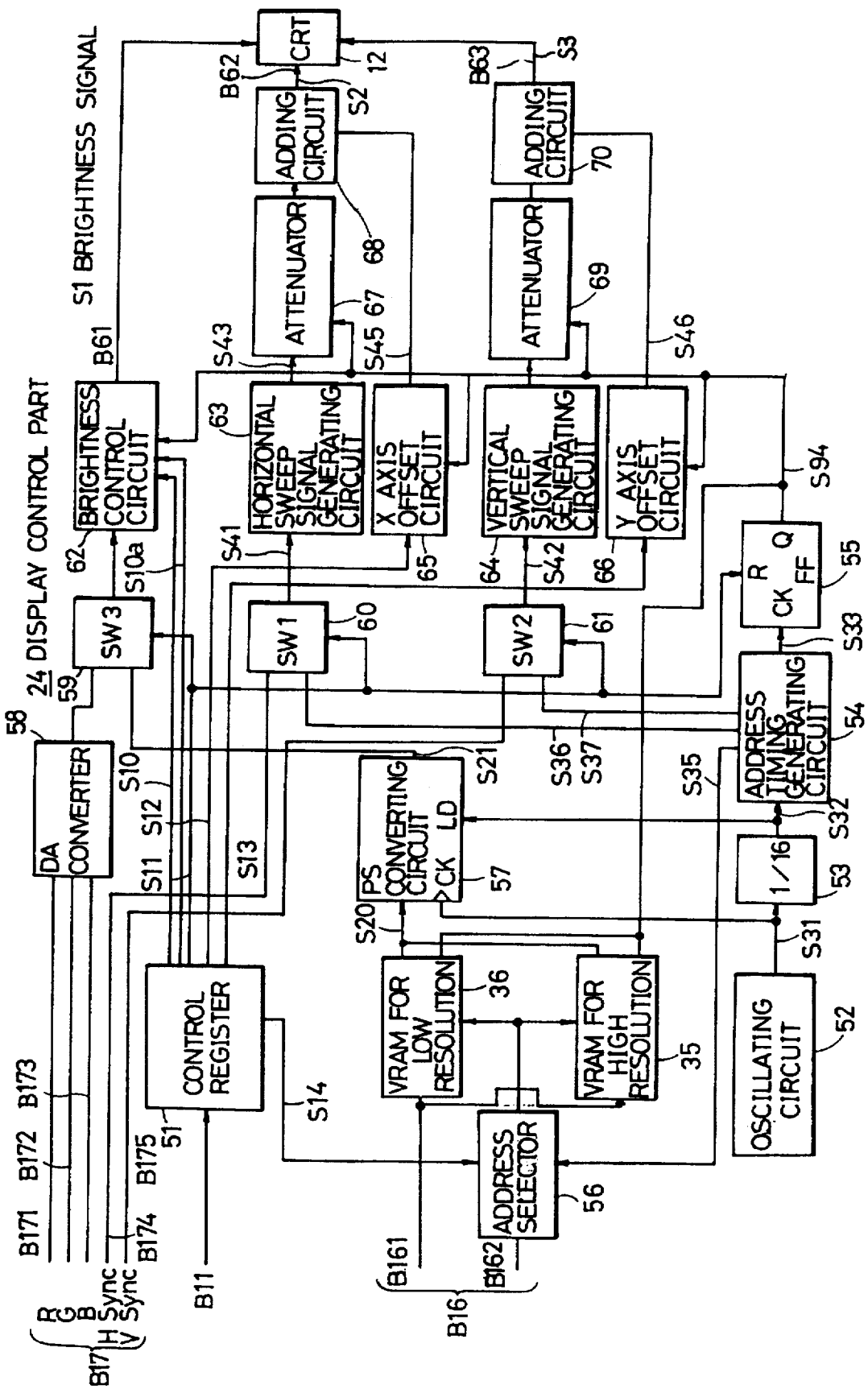
FIG. 3 is a block diagram illustrating an example of circuitry of a display control part in FIG. 2.

FIG. 3 is a block diagram illustrating an example of circuitry of display control part 24.

Image data from frame memory 31 is transmitted through a signal line B16 to VRAM 35 for high resolution and VRAM 36 for low resolution. This transmission is executed by designation by main control unit 21 when image data to be displayed is changed, and it becomes necessary to update VRAMs 35, 36.

Data stored in VRAM 35 for high resolution and VRAM 36 for low resolution are converted to a brightness signal S1, a horizontal sweep signal S2, and a vertical sweep signal S3 by a peripheral video control part 34 and provided to CRT display unit 12 as will be described in the following.

Video control part 34 also controls image data applied through a signal line B2 of host computer 10 to display it.

Specifically, image data applied directly from host computer 10 is different from image data read from frame memory 31 and, after passing through video IF 28, is supplied through color signal lines B171–173 of RGB and two synchronizing signal lines B174, B175.

Signals supplied through color signal lines B171–173 are converted into analog signals, respectively, by DA converter 58 and applied to a switch 59. Signals through two synchronizing signal lines B174, 175 are applied to switches 60, 61, respectively.

A signal S10 for temporarily erasing display of CRT display unit 12, a signal S10a for adjusting the ratio of the average brightness of a low resolution display region to the average brightness of a high resolution display region, a signal S11 for switching between the direct display mode and partial high resolution mode, offset signals S12, 13 for providing offset values on an X axis (in a horizontal direction) and a Y axis (in a vertical direction) of high resolution display region G2, and a signal S14 for switching an address on the occasion of accessing VRAM 35 for high resolution or VRAM 36 for low resolution are set from main control unit 21 to a control register 51.

Switching between the direct display mode and the partial high resolution mode is carried out by simultaneously changing over three switches 59–61 by signal S11.

At the same time that switches 59–61 are changed over by signal S11, a flip-flop 55 is reset, and a signal S34 is set to "L" for a low resolution display cycle.

According to this, outputting of offset signals S45, S46, from an X axis offset circuit 65 and a Y axis offset circuit 66 is inhibited, attenuators 67, 69 are not operated and brought to "through", the level of a brightness signal S1 provided from a brightness control circuit 62 is changed over to a predetermined higher one to carry out a change over to reading of image data from VRAM 36 for low resolution.

Image data stored in VRAM 35 for high resolution or VRAM 36 for low resolution is sequentially read in a predetermined unit (16 bits, for example), and a read signal S20 is converted into a serial signal S21 by a parallel-to-serial converting circuit 57 and then transmitted to brightness control circuit 62.

An address signal S35 for performing reading from VRAM 35 for high resolution or VRAM 36 for low resolution is generated by counting a signal S32, which is obtained by dividing an output signal S31 from an oscillating circuit 52 by a dividing circuit 53, by an address timing generating circuit 54.

In addition, signal S31 provided from oscillating circuit 52 is used as a clock for shift of parallel-to-serial converting circuit 57, and signal S32 is also used as a signal for loading the data (signal S20) read from the VRAMs into parallel-to-serial converting circuit 57.

A horizontal synchronizing signal S36, a vertical synchronizing signal S37, and a signal S33 indicating the end of display of one frame, which are used in displaying image data, are also provided from address timing generating circuit 54. A signal S33 is applied to flip-flop 55, and a signal S34 for switching between the low resolution display cycle and a high resolution display cycle as described above is provided.

Horizontal synchronizing signal S41 and vertical synchronizing signal S42 activate sweep signals in a horizontal sweep signal generating circuit 63 and a vertical sweep signal generating circuit 64, and output signals S43, 44 therefrom are added to offset signals S45, 46, by adding circuits 68, 70 to provide a horizontal sweep signal S2 and a vertical sweep signal S3 to CRT display unit 12.

Attenuators 67, 69 are for compressing the amplitudes of sweep signals S43, 44, and scanning only within high resolution display region G2 in the high resolution display cycle.

Thus, output signal S34 from flip-flop 55 is switched alternately to "L" and "H" to perform alternate switching between the low resolution display cycle and the high resolution display cycle.

Figure 4:
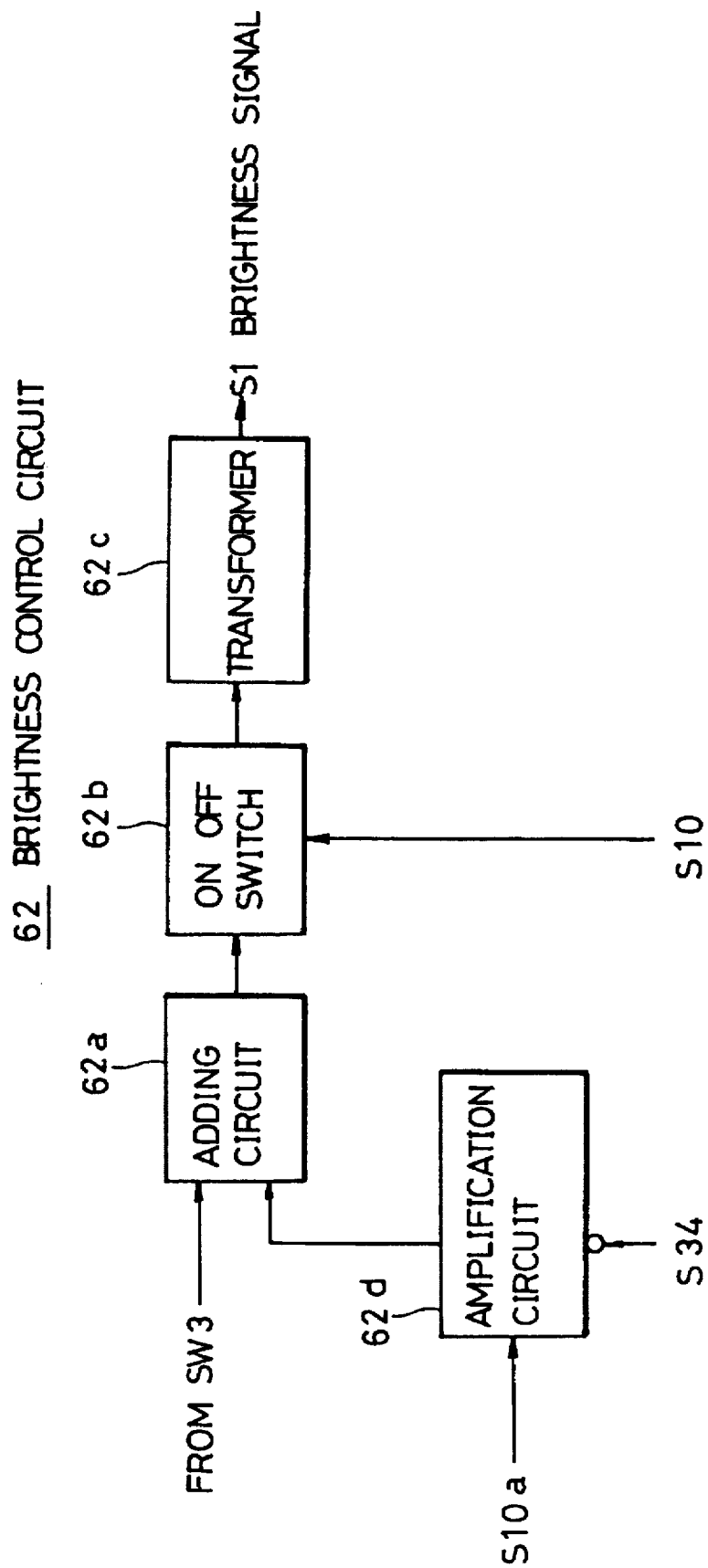
FIG. 4 is a block diagram illustrating an example of circuitry of a brightness control circuit in FIG. 3.

FIG. 4 is a block diagram illustrating an example of circuitry of brightness control circuit 62.

Brightness control circuit 62 includes an adding circuit 62a, an ON-OFF switch 62b, a transformer 62c, and an amplifying circuit 62d. In the high resolution display cycle, output signal S34 from flip-flop 55 is amplified to a predetermined value in amplifying circuit 62d and applied to adding circuit 62a to control the level of brightness signal S1 so that the quantity of light radiated from a part corresponding to one pixel in low resolution display region G1 becomes high, and the amplification gain of amplifying circuit 62d is changed to adjust the average brightness of low resolution display region G1 and the average brightness of high resolution display region G2 so that they are unified.

A signal S10a for adjusting the ratio of the average brightness on the basis of a predetermined value according to operation panel P is applied to amplifying circuit 62d, and the amplification factor for output signal S34 in amplifying circuit 62d is changed on the basis of signal S10a.

ON-OFF switch 62b cuts off or connects a signal from adding circuit 62a in accordance with an output signal S10 from control register 51.

The position of high resolution display region G2 is determined by offset signals S12, 13 which are set from main control unit 21 by operating mouse 16, so that it is possible to designate any region as high resolution display region G2 by operating mouse 16.

Accordingly, it is possible to display any part to be noted which an operator wants to view with high resolution without raising frequencies of sweep signals S2, 3 and also to display simultaneously and look over the whole or a large region of an image even if image plane 12a of CRT display unit 12 is large, and there is also an advantage with respect to cost.

According to this, it is possible to display the state of printing by printer unit 13 in CRT display unit 12 in the partial high resolution mode to confirm it easily in detail.

Now, a processing operation of the above-described display control unit 11 will be described on the basis of a flow chart.

Figure 10:
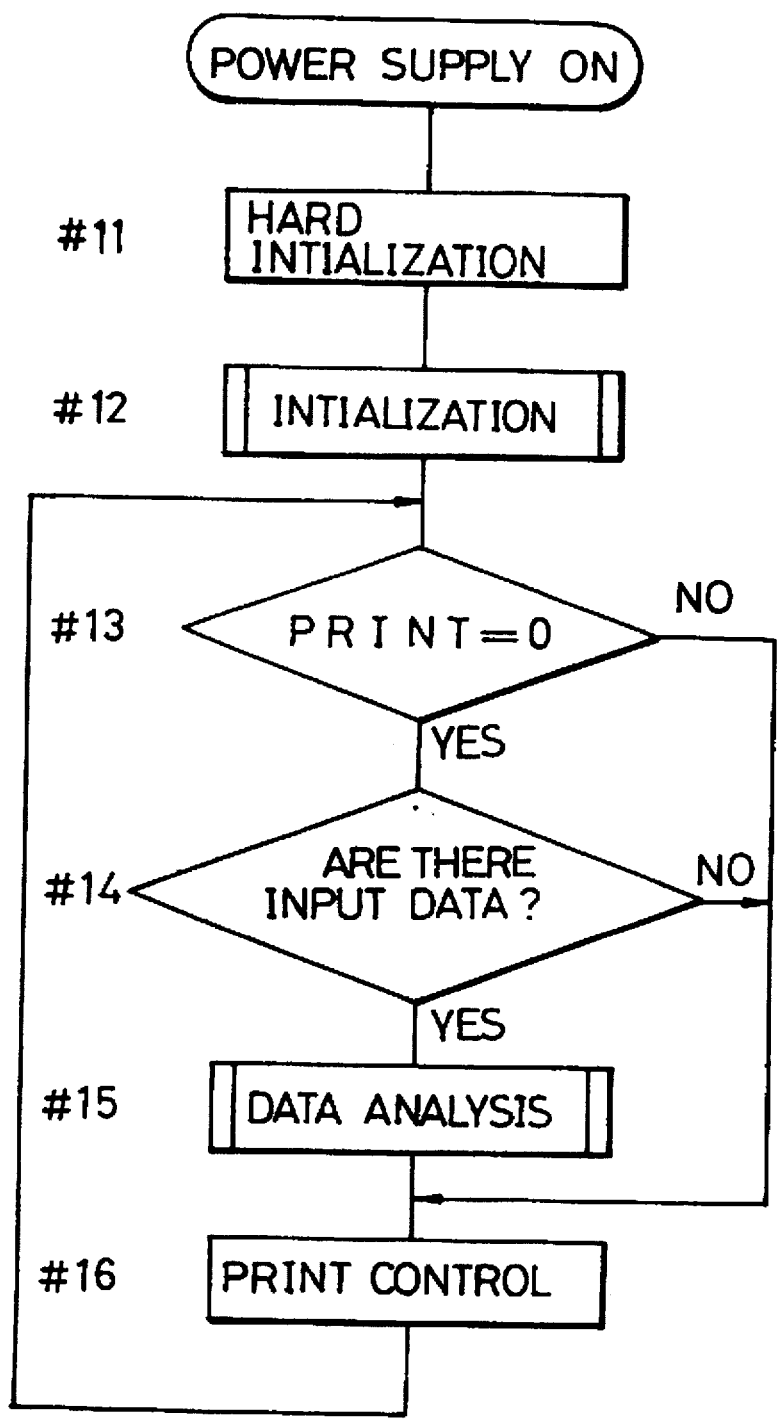
FIG. 10 is a flow chart illustrating a main routine of the display control unit in FIG. 1.

FIG. 10 is a main flow chart of display control unit 11.

When a switch for a power supply is turned on, after initialization of each part (a step #11), initialization processing is carried out (a step #12), and a processing loop (steps #13–#16) is entered.

In the processing loop, data applied from host computer 10 is analyzed (step #15), and printer unit 13 is controlled (step #16). Data is not analyzed during printing by printer unit 13.

Control of the display by CRT display unit 12 and control of keyboard 15, mouse 16, and so forth are performed by timer interruption activated a predetermined cycle by a timer in main control unit 21 or by an interruption processing routine activated by an operation input signal from mouse 16 or keyboard 15.

Figure 11:
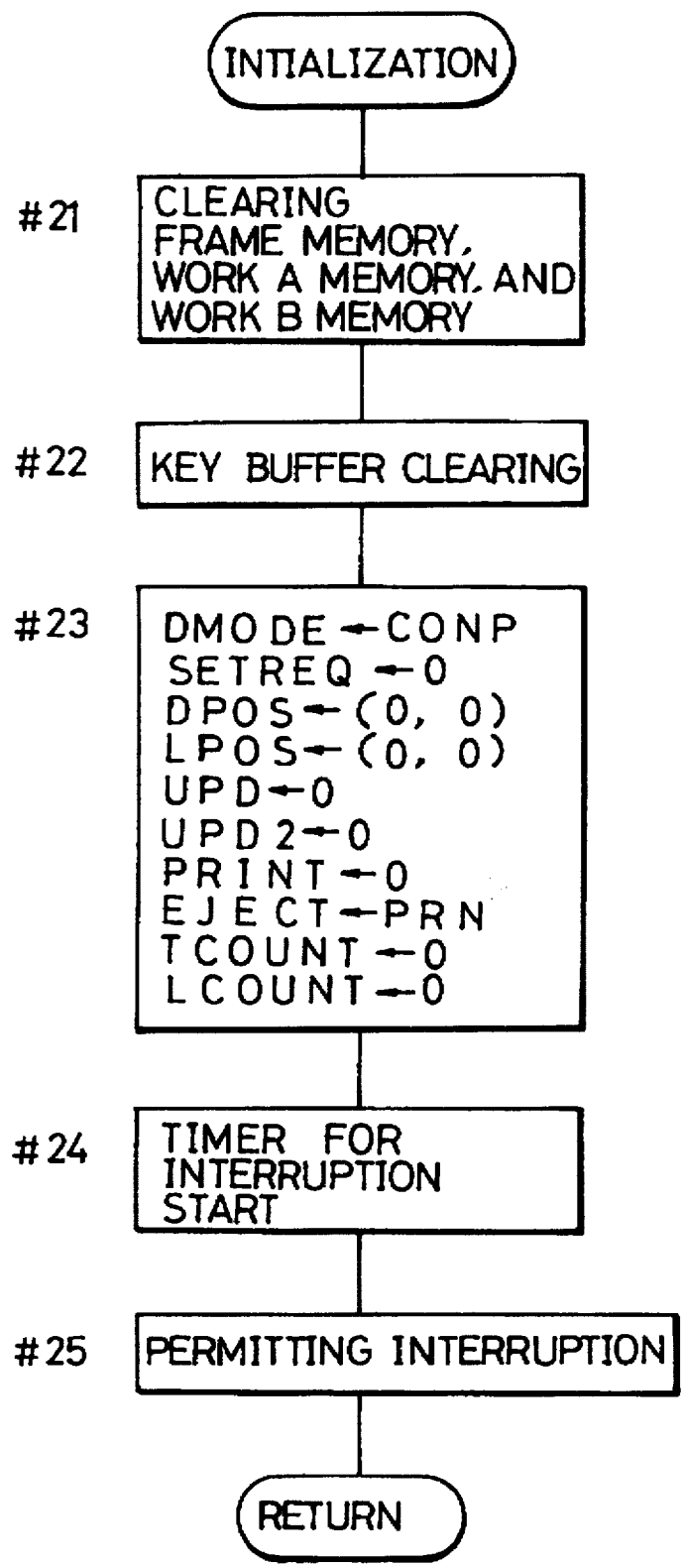
FIG. 11 is a flow chart illustrating initialization processing in FIG. 10.

FIG. 11 is a flow chart of initialization processing.

In initialization processing, user memory 22 for partial high resolution display processing is cleared (a step #21), a buffer for storing data from keyboard 15 is cleared (a step #22), initialization of various variables and flags for control is performed (a step #23), a timer for activating the interruption processing routine is set (a step #24), and interruption is permitted (a step #25).

If interruption is permitted, the interruption processing routine is activated in response to an interruption request while the processing loop is executed. Various variables and flags for control are as follows.

DMODE indicates whether CRT display unit 12 and mouse 16 are controlled by host computer 10 (CONP) or controlled by processing in display control unit 11 (PRN).

SETREQ is a flag indicating that two setting buttons 16a, 16b of mouse 16 are pressed in a case where DMODE=PRN.

DPOS indicates an address on frame memory 31 in high resolution display region G2 designated by mouse 16.

LPOS indicates the value of DPOS before updating in a case where high resolution display region G2 is updated.

UPD is a flag indicating a request for updating VRAM 36 for low resolution.

PRINT is a flag indicating a request for an output to printer unit 13 of frame memory 31.

EJECT is a flag indicating whether display is performed by CRT display unit 12 or printing (hard copy) is performed by printer unit 13 when editing of one page is completed on frame memory 31.

TCOUNT is an internal timer updated for every timer interruption.

LCOUNT is a timer controlling the shortest cycle on the occasion of updating the position of high resolution display region G2 by mouse 16.

Figure 12:
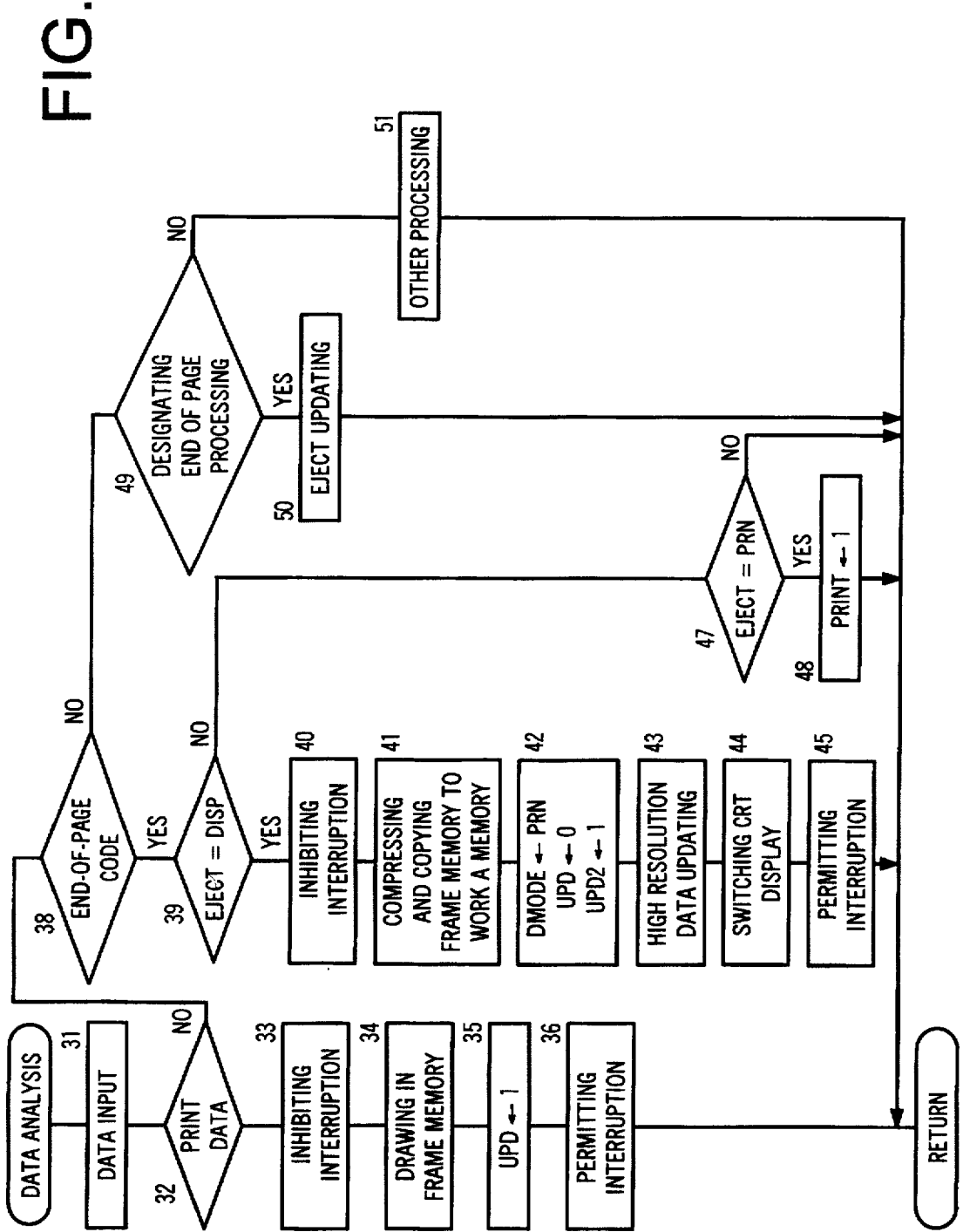
FIG. 12 is a flow chart illustrating data analysis processing in FIG. 10.

FIG. 12 is a flow chart of data analysis processing.

First, data is applied from host computer 10 (a step #31).

When it is a print data (YES in a step #32), interruption is inhibited to inhibit frame memory 31 from being accessed from other programs (a step #33), an image corresponding to the input data is drawn in frame memory 31 (a step #34), flag UPD indicating updating of frame memory 31 is set (a step #35), and interruption is permitted (a step #36).

Flag UPD is checked in timer interruption processing, and display in CRT display unit 12 is updated as necessary.

In a case where the input data is an end-of-page code (YES in a step #38), processing designated in advance is performed. This processing is changeable according to a command from host computer 10 (steps #49, #50).

In a case where EJECT=DISP (YES in a step #39), display is performed by CRT display unit 12 (steps #40–#45).

Specifically, first, interruption is inhibited (step #40), and making access to frame memory 31 from other programs is inhibited. Then, the content of frame memory 31 is compressed at a predetermined magnification and copied in work A memory 32 (step #41).

The content of work A memory 32 becomes the master data for low resolution display region G1 afterward. It is copied into work B memory 33 with high resolution display region G2 being masked and is further copied into VRAM 36 for low resolution to display it together with an image of high resolution display region G2 in CRT display unit 12.

If display is completed, display mode DMODE is changed, and updating flag UPD is reset for inhibiting updating of display in timer interruption (a step #42). Switching of the display mode is performed by updating signal S11 of control register 51.

High resolution data updating processing for updating image data in high resolution display region G2 is performed (a step #43), the display mode is switched to the partial high resolution mode (a step #44), interruption is permitted (a step #45), and updating by mouse 16 is permitted.

In a case where EJECT=PRN, i.e., in a case where processing on the occasion of the end of editing is printing (NO in step #39, and YES in step #47), flag PRINT is set (step #48). A sequence of print is processed by control of printer unit 13 in step #16.

Figure 13:
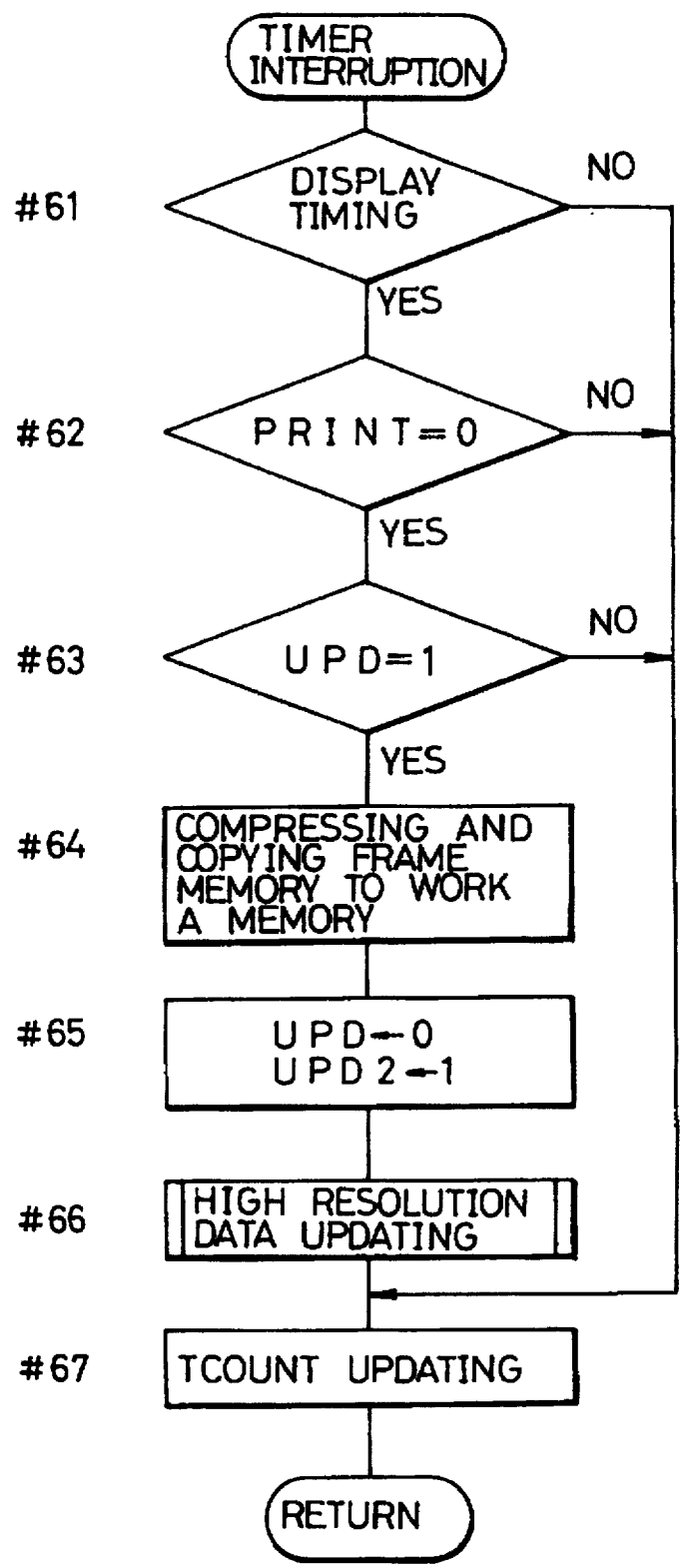
FIG. 13 is a flow chart illustrating timer interruption processing in FIG. 11.

FIG. 13 is a flow chart of timer interruption processing.

This processing routine is activated by the timer set in main control part 21 in step #24.

The condition of editing the frame memory 31 is updated to CRT display unit 12 (steps #61–66), and soft controlling timer TCOUNT is updated (a step #67) there.

Updating of display in CRT display unit 12 is performed when timer TCOUNT is a multiple of a predetermined value (yes in step #61), i.e. when printing in printer unit 13 is not performed on a predetermined cycle (YES in step #62), and frame memory 31 is updated on or after display of the last time (YES in step #63).

Processing (steps #64–66) for actual display is the same as the above-described steps (steps #41–43).

After display processing, flag UPD indicating updating of frame memory 31 is reset (step #65).

Figure 14:
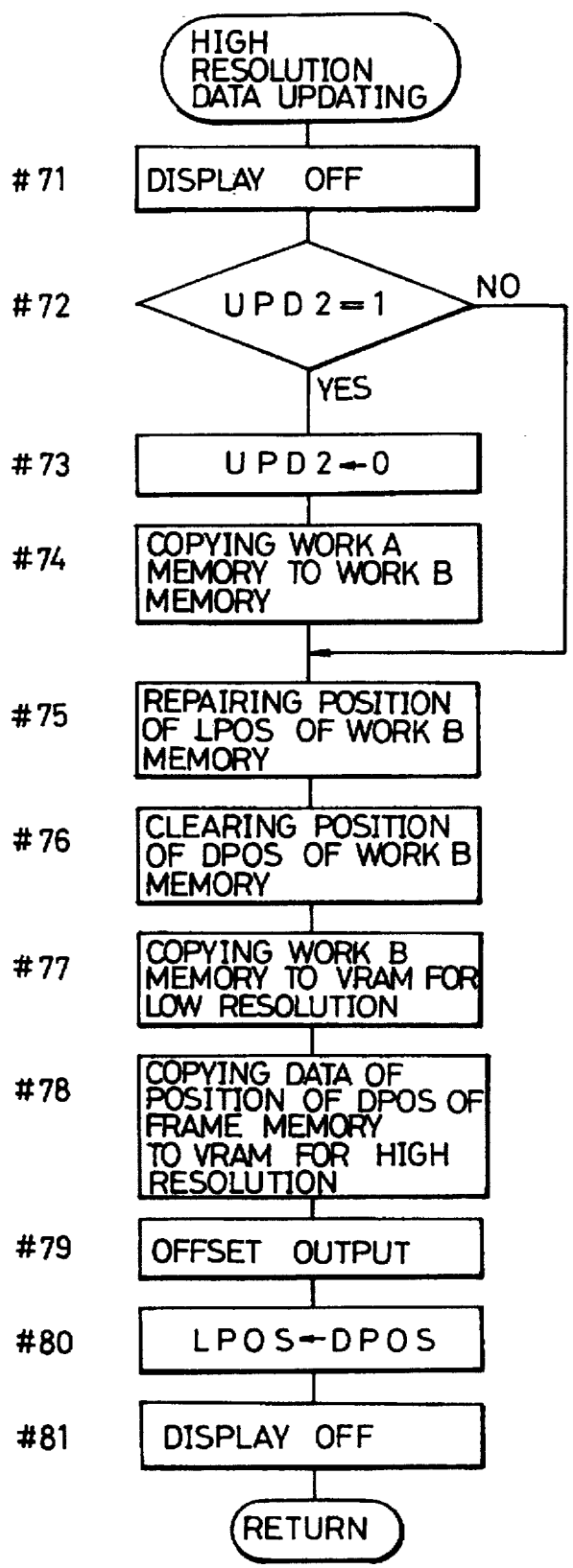
FIG. 14 is a flow chart illustrating high resolution data updating processing in FIG. 13.

FIG. 14 is a flow chart of high resolution data updating processing.

While various memories for display are operating, the image plane is darkened by signal S10 from control register 51 and made "display off" (steps #71, #81).

Lump-sum updating (step #74) of work B memory 33 is performed when work A memory 32 is updated in accordance with updating of frame memory 31 (YES in a step #72). In other cases, repairing of high resolution display region G2 (the position of LPOS) deleted the previous time in accordance with data of work A memory 32 (a step #75), deleting of a position corresponding to a position (DPOS) newly designated as high resolution display region G2 (a step #76), copying of the content of work B memory 33 to VRAM 36 for low resolution (a step #77), updating of VRAM 35 for high resolution (a step #78), and setting of offset values on an X axis and a Y axis in accordance with DPOS to control register 51 (step #79) are performed. At this time, LPOS is updated with DPOS to store a position to be repaired next time (a step #80).

Figure 15:
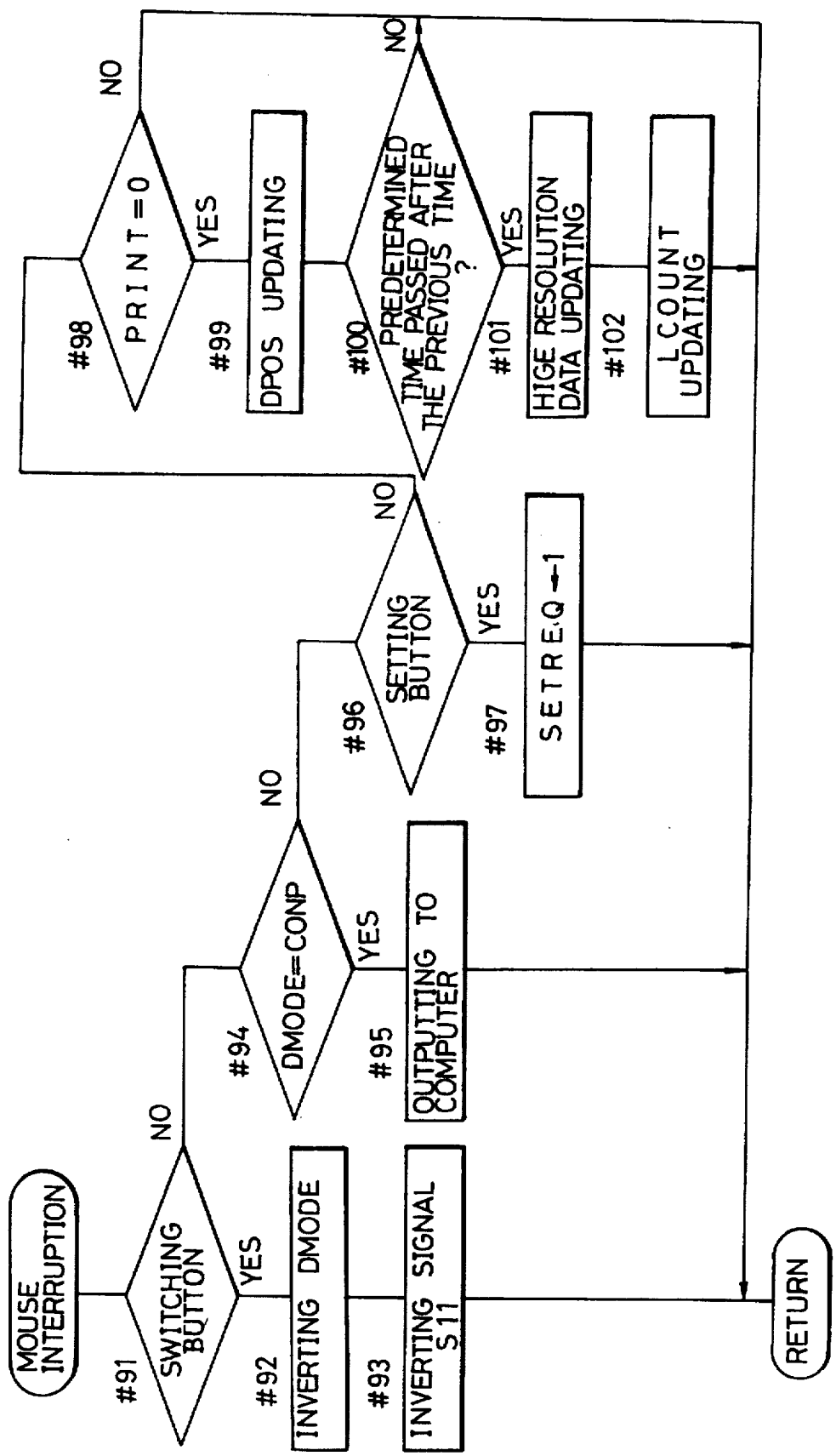
FIG. 15 is a flow chart illustrating mouse interruption processing in FIG. 12.

FIG. 15 is a flow chart of mouse interruption processing.

Mouse 16 is provided with two setting buttons 16a, 16b and an exclusive switching button 16c, and, if a signal indicating that either of them is pressed or a signal indicating the amount of movement is applied, mouse interruption is activated (step #91).

An input signal from switching button 16c is always processed only in display control unit 11 and is used in inversion of display mode DMODE (COMP or PRN) in CRT display unit 12 (a step #92).

In inversion of the display mode, signal S11 from control register 51 is inverted (a step #93).

Signals provided from mouse 16 other than the one due to switching button 16c are differently processed in accordance with display mode DMODE.

In the case of the direct display mode, i.e., in a case where the image data is displayed on the basis of signal line B2 of host computer 10 (YES in a step #94), all the signals other than the signal from switching button 16c are provided to host computer 10 (a step #95).

In the case of the partial high resolution mode, i.e. in a case where image data by display control unit 11 is displayed (NO in step #94), there is no output to host computer 10.

A case of signals from setting buttons 16a, 16b (YES in a step #96), a provisional flag SETREQ is set to be used in changing the condition of operation of display control unit 11 (a step #97), although not shown in this embodiment. A move signal of mouse 16 is a signal other than these signals, which updates DPOS in accordance with the amount of movement and the direction of movement (a step #99) if it is not during printing (YES in a step #98) and displays corresponding high resolution display region G2 (a step #101).

At this time, timer TCOUNT is stored as the last updating time LCOUNT (a step #102) and is updated only when a predetermined time has passed after the previous updating (YES in a step #100) to prevent high resolution display region G2 from being updated more than necessary.

This is for the purpose of securing time for other processing, for example, communication with host computer 10 or the like, for example, in main control part 21.

Figure 16:
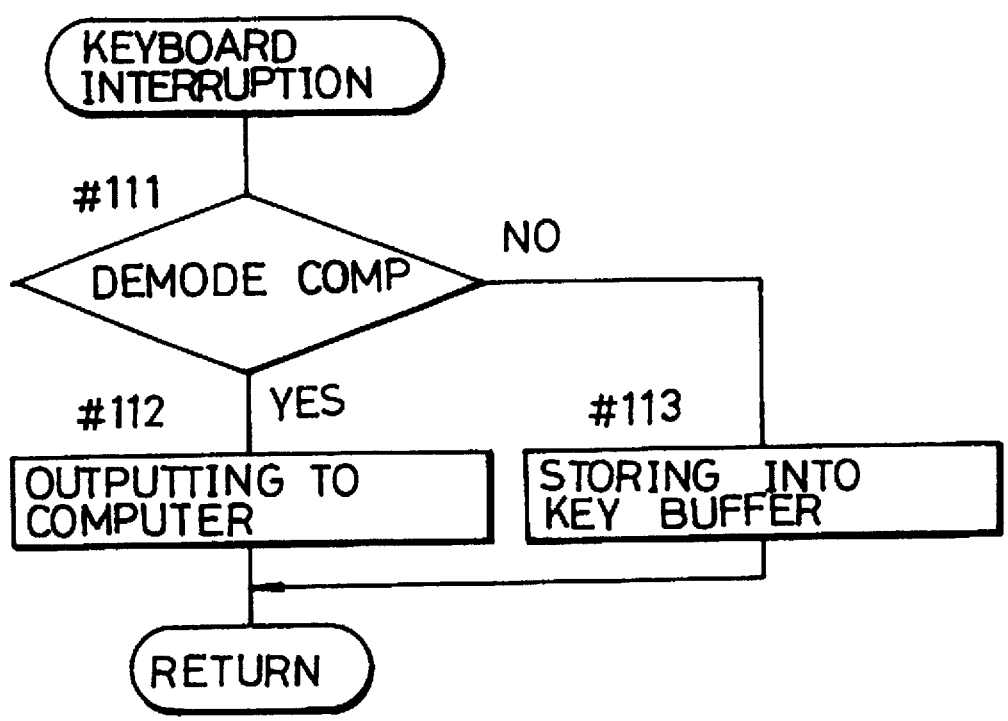
FIG. 16 is a flow chart illustrating keyboard interruption processing in FIG. 12.

FIG. 16 is a flow chart of keyboard interruption processing.

If keyboard 15 is pressed, as in the case of mouse interruption processing, all the signals are provided to host computer 10 (a step #112) in the case of the direct display mode (YES in a step #111), while they are stored in a key buffer in main control part 21 to be used in processing by main control part 21 (a step #113) in other cases.

While a case where CRT display unit 12 is used as an image plane has been described in the above embodiment, a case where a projection screen is used as an image plane will be described next.

Figure 17:
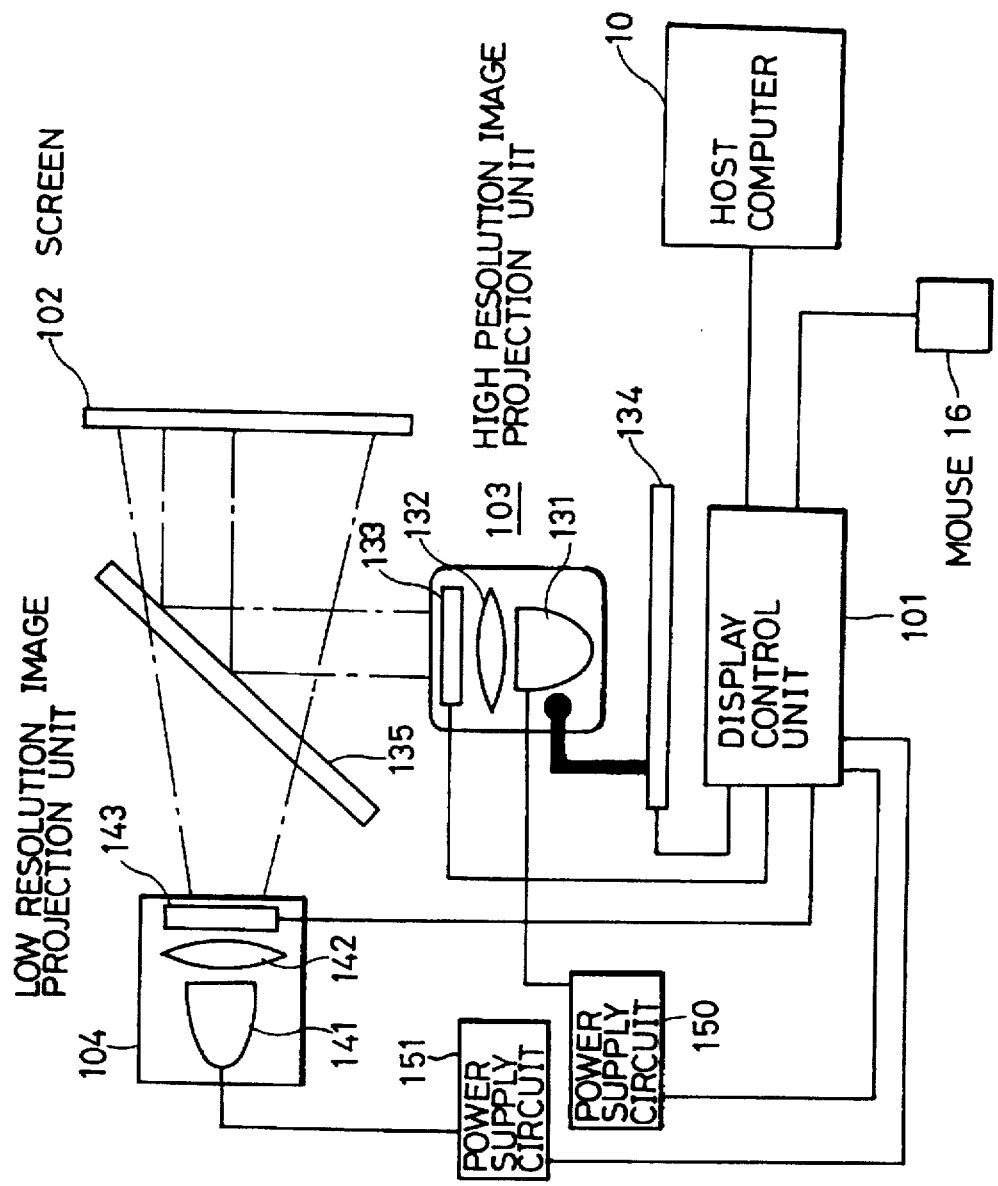
FIG. 17 is a diagram illustrating a structure of an image display apparatus according to another embodiment of the present invention.
Figure 18:
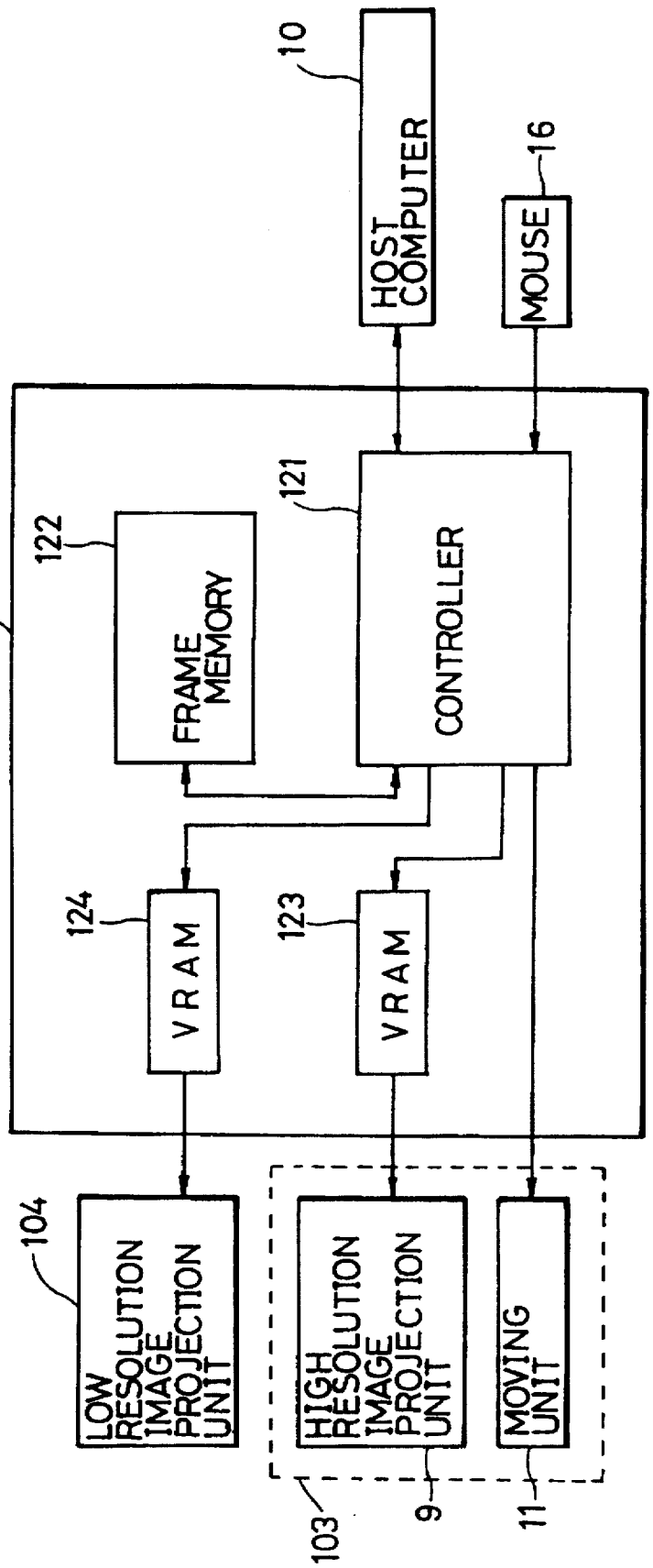
FIG. 18 is a block diagram illustrating the image display apparatus in FIG. 17.

FIG. 17 is a diagram illustrating structure of an image display apparatus 3 of another embodiment according to the present embodiment, and FIG. 18 is a block diagram of image display apparatus 3 in FIG. 17.

Image display apparatus 3 includes a display control unit 101, a screen 102 which is an image plane, a high resolution image projection unit 103, a low resolution image projection unit 104, a host computer 10, a mouse 16, and so forth.

Display control unit 101 includes a controller 121, a frame memory 122 of high resolution, a VRAM 123 for high resolution, and a VRAM 124 for low resolution.

Frame memory 122 has a capacity (M pixels in a longitudinal direction and N pixels in a lateral direction) capable of storing the whole image data transmitted from host computer 10 with high resolution, and the content of one address corresponds to the brightness value of one pixel in a case where it is assumed that high resolution display of the whole image plane is performed.

VRAM 123 for high resolution has a capacity smaller than that of frame memory 122, which is of M/m pixels in a longitudinal direction and N/n pixels in a lateral direction. A part of image data stored in frame memory 122 is transferred intact to and stored in VRAM 123 for high resolution by controller 121.

VRAM 124 for low resolution is a memory having a capacity of m pixels in a longitudinal direction and n pixels in a lateral direction. Image data stored in frame memory 122 is compressed and transferred to VRAM 124 for low resolution by controller 121, and image data in a part corresponding to a high resolution display region G2 designated by mouse 16 is erased.

Screen 102 is one with which an image projected from the rear surface can be viewed from the front surface.

High resolution image projection unit 103 includes a light source 131, a lens 132, a transparent liquid crystal panel 133, a moving unit 134 for moving the whole of them to an arbitrary position on a second dimensional plane, and a half mirror 135.

An image of a content stored in VRAM 123 for high resolution is displayed on transparent liquid crystal panel 133 and is projected to a part of screen 102 by light source 131, lens 132, and half mirror 135.

Moving unit 134 is for moving a position on screen 102 to which projection is performed by high resolution image projection unit 103, i.e. the position of high resolution display region G2, and is constituted using a pulse motor, a screwed bar, a nut, and the like, for example.

Low resolution image projection unit 104 includes a light source 141, a lens 142, and a transparent liquid crystal panel 143. Although they are the same as the ones used in the above-described high resolution image projection unit 103, the focal distance or arrangement of lens 142 are different from those in the above case because they are for projection on the whole surface of screen 102.

An image of a content stored in VRAM 124 for low resolution is displayed on transparent liquid crystal panel 143 and is projected on the whole surface of screen 102 by light source 141 and lens 142.

Accordingly, on the whole of screen 102, an image of low resolution display region G1 of m×n pixels, equal to the capacity of VRAM 124 for low resolution, is displayed with low resolution, and high resolution display region G2 of 1/m in a longitudinal direction and 1/n in a lateral direction of it is displayed with high resolution.

Signals corresponding to setting by an operation panel P which is the same as the one in the first embodiment are applied from display control unit 101 to a power supply circuit 150 of light source 131 and a power supply circuit 151 of light source 141, respectively, and the ratio of the quantity of light of light source 131 to that of light source 141 is changed by these signals.

Image data and signal from host computer 10 and mouse 16 are applied to controller 121 of display control unit 101.

Now, operation of image display unit 3 will be described.

The principle of a partial high resolution display operation by image display unit 3 is the same as that of the above-described image display unit 2, so that operation particular to image display unit 3 will be mainly described now.

If a switch for a power supply of image display unit 3 is turned on, controller 121 performs initialization.

In initialization, frame memory 122 is cleared, and an initial display position by high resolution image projection unit 103 is determined.

A central part of screen 102, i.e., a central part of frame memory 122, is selected as the initial display position, and an address of a pixel position at an upper left end of high resolution display region G2 is retained as a high resolution display position.

If initialization is ended, controller 121 repeats processing of reading image data from host computer 10 and writing of it into frame memory 122. During doing this, timer interruption and mouse interruption are permitted.

Timer interruption is for implementing smooth movement on screen 102 and is performed on a cycle of about 1/30 seconds or less.

If timer interruption is generated, controller 121 informs moving unit 134 of that to provide a drive starting signal for starting moving.

Then, image data for low resolution is generated from the content of frame memory 122 and written into VRAM 124 for low resolution.

The following processing is performed in generating image data for low resolution.

Specifically, in a case where a pixel to be noted in frame memory 122 is not included in high resolution display region G2, an average of values (brightness values) of (M/m)×(N/n) pieces of image data included in a region of M/m in a longitudinal direction and N/n in a lateral direction where the pixel to be noted is at an upper left end is found and written as a value of a corresponding pixel of VRAM 124 for low resolution.

If a pixel to be noted is included in high resolution display region G2, a value indicating a brightness value "0" is written in a corresponding pixel of VRAM 124 for low resolution.

The above operation is performed for N/n dots in the lateral direction and for M/m pixels in the longitudinal direction, respectively, to write a compressed image having high resolution display region G2 masked into VRAM 124 for low resolution.

Figure 19:
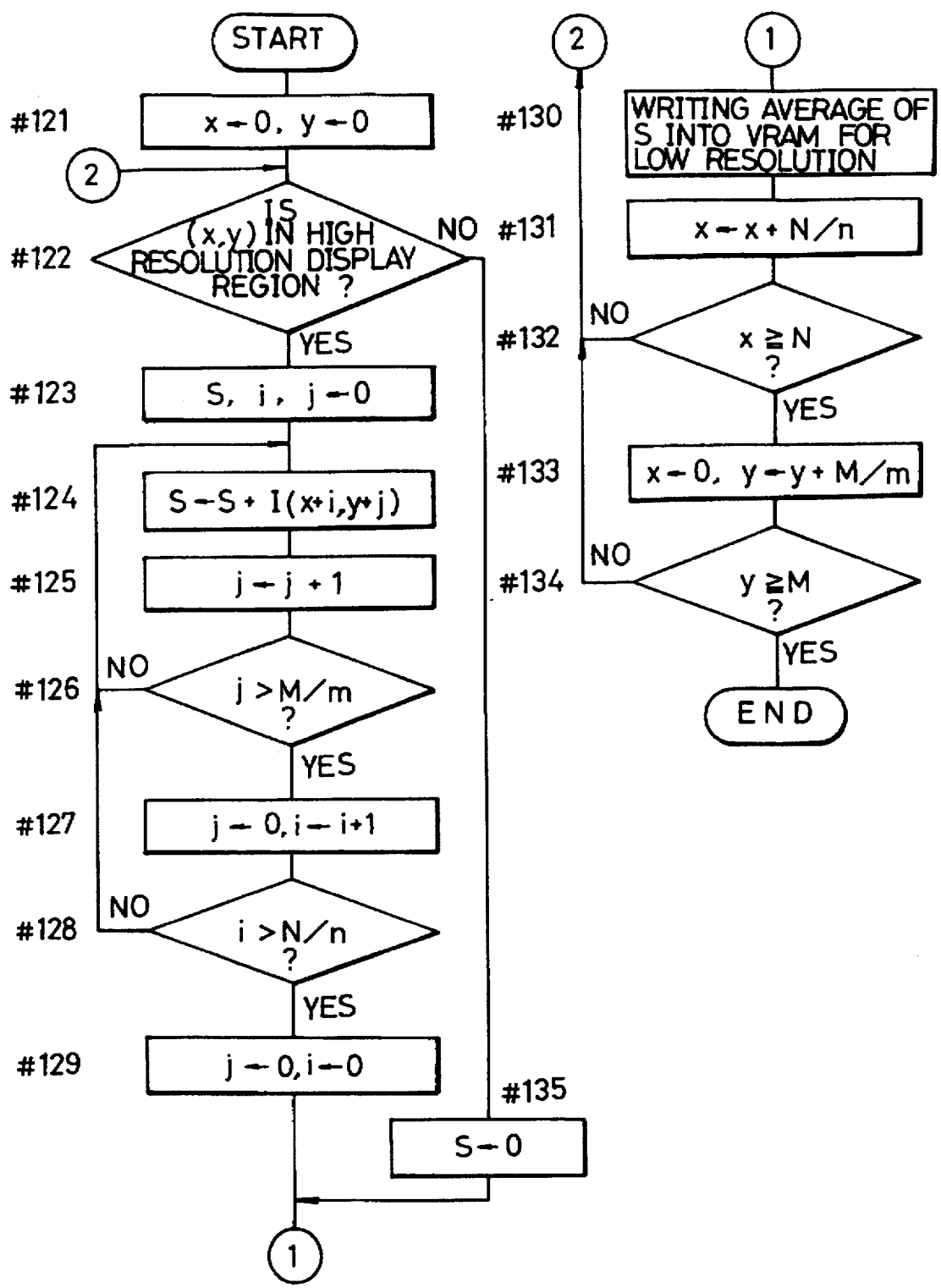
FIG. 19 is a flow chart illustrating low resolution image data generating processing in an image display apparatus according to the embodiment of the present invention in FIG. 17.

FIG. 19 is a flow chart illustrating processing of generating low resolution image data.

In this flow chart, first, variables x, y are cleared (a step #121).

It is determined whether an address plotted on coordinates by these variables x, y, is out of high resolution display region G2 or not (a step #122).

In the case of YES in step #122, a total value of brightness values i of respective image data of pixels included in a region of M/m in a longitudinal direction and N/n in a lateral direction is found (steps #123–#129), and the average of it is written into VRAM 124 for low resolution (a step #130).

In the case of NO in step #122, the total value is made "0" (a step #135).

These processes are performed until x becomes equal to N for every N/n dots in a lateral direction (steps #131, #132), and then performed until y becomes equal to M for every M/m pixels in the longitudinal direction (steps #133, #134).

Then, the content of M/m pixels in the longitudinal direction and N/n pixels in the lateral direction of frame memory 122 is transferred to VRAM 123 for high resolution on the basis of the retained high resolution display position.

Then, in a case where there is an input thereto from mouse 16, mouse interruption performs processing for moving high resolution display region G2 in accordance with the amount of its movement and updating the high resolution display position.

Specifically, controller 121 changes the content of VRAM 123 for high resolution on the basis of two dimensional movement data from mouse 16.

In a case where the amount of movement of mouse 16 is a (pixels) in a lateral direction and b (pixels) in a longitudinal direction, the position of a pixel at an upper left end of high resolution display region G2 is "0" in a case where $$N \times b + a < 0 \ldots \quad (1),$$

"N×n+a" in a case where $$0 \leq N \times b + a < N \times M - (N \times M)/(n \times m) \ldots \quad (2),$$

and

"N×M−(N×M)/(n×m)" in a case where $$N \times M - (N \times M)/(n \times m) \leq N \times b + a \ldots \quad (3).$$

A point thus found is made to be at an upper left end, and image data of a region of M/m pixels in a longitudinal direction and N/n pixels in a lateral direction is transferred to VRAM 123 for high resolution.

An address of the upper left end is retained as a high resolution display position and also is provided to moving unit 134.

Although the luminous intensity of a light source is automatically or manually adjusted by controlling voltages or currents of light sources 131, 141 so that an image of low resolution display region G1 and an image of high resolution display region G2 displayed on screen 102 have the same brightness in the above embodiment, it is also possible to adjust the amount of transmitted light automatically by controlling the concentrations of images displayed on transparent liquid crystal panels 133, 143.

According to the above embodiment, it is possible to display a part to be noted definitely and also to display the whole or a large region of an image even if CRT display unit 12 or screen 102 is a large image plane.

According to the above embodiment, nonuniformity in brightness caused by a difference between the pixel density of high resolution display region G2 and the pixel density of low resolution display region G1 is corrected by automatically switching the maximum brightness by brightness control circuit 62 in image display unit 2 and by automatically controlling the luminous intensity of light sources 131, 141 or the concentrations of images on transparent liquid crystal panels 133, 143, in image display unit 3, respectively, so that the whole image is always displayed with appropriate brightness, and it is possible to obtain satisfactory visibility.

However, in order to make the range of high resolution display region G2 definite, for example, the brightness of high resolution display region G2 may be made a little higher than that of low resolution display region G1 by intention.

According to the above embodiment, it is possible to control both of host computer 10 and display control unit 11, by one mouse 16 and one keyboard 15, so that it is possible to lower the cost for the whole of image display units 2, 3 as well as to simplify operation.

In the above embodiment, host computer 10, display control units 11, 101, CRT display unit 12, high resolution image projection unit 103, low resolution image projection unit 104, and image display units 1, 2, 3 and the structure of each part of them can be changed variously to be other than the above-described ones.

Although the present invention has been described and illustrated in detail, it is clearly understood that the same is byway of illustration and example only and is not to be taken by way of limitation, the spirit and scope of the present invention being limited only by the terms of the appended claims.

What is claimed is:

1. An image display system, comprising:
   an image plane on which an image is displayed, said image plane being capable of displaying images at a variety of image pixel densities,
   primary means for displaying said image on said image plane,
   said primary displaying means including first means for displaying a part of said image with a predetermined resolution in a predetermined image pixel density, and second means for displaying another part of said image with a resolution of a level higher than the level of said predetermined resolution in an image pixel density higher than the predetermined image pixel density without magnifying the another part.

2. The image display system according to claim 1, wherein said image plane includes a Cathode-Ray Tube.

3. The image display system according to claim 1, wherein said image plane includes a liquid crystal display panel.

4. The image display system according to claim 1, further comprising means for designating resolution of said image by using a mouse.

5. The image display system according to claim 1, further comprising means for designating resolution of said image by using a keyboard.

6. The image display system according to claim 1, further comprising means for changing the resolution level of the high level resolution.

7. The image display system according to claim 1, wherein the image plane is capable of displaying images at a variety of image pixel densities at a constant level of magnification.

8. An image display apparatus, comprising:
   image data storing means for storing image data to be displayed;
   an image plane provided for displaying an image, said image plane being capable of displaying images at a variety of image pixel densities;
   low resolution image display means for displaying an image based on said image data on said image plane with low resolution in a first image pixel density;
   position designating means for designating a particular region in said image plane; and
   high resolution image display means for displaying an image based on said image data in the particular region designated by said position designating means on said image plane with a resolution level higher than the resolution level of said low resolution in a second image pixel density higher than the first image pixel density without magnifying it.

9. The image display apparatus according to claim 8, wherein the resolution level of said high resolution is changeable.

10. The image display apparatus according to claim 9, wherein the number of pixels of an image displayed with said low resolution and the number of pixels of an image displayed with said high resolution are substantially equal.

11. The image display apparatus according to claim 10, wherein as the range of said particular region becomes smaller, the resolution level of said high resolution becomes higher.

12. The image display apparatus according to claim 8, wherein said image plane includes a Cathode-Ray Tube.

13. The image display apparatus according to claim 8, wherein said image plane includes a liquid crystal display panel.

14. The image display apparatus according to claim 8, wherein said position designating means includes a mouse.

15. The image display apparatus according to claim 8, wherein said position designating means includes a keyboard.

16. The image display system according to claim 8, wherein the image plane is capable of displaying images at a variety of image pixel densities at a constant level of magnification.

17. An image display apparatus, comprising:
   an image plane provided for displaying an image, said image plane being capable of displaying images at a variety of image pixel densities;
   low resolution image display means for displaying an image on said image plane with low resolution in a first image pixel density;
   high resolution image display means for displaying an image in a particular region in said image plane with a resolution level higher than the resolution level of said low resolution in a second image pixel density higher than the first image pixel density; and
   brightness changing means for changing the ratio of the average brightness of an image displayed with said high resolution to the average brightness of an image displayed with said low resolution.

18. The image display apparatus according to claim 17, wherein the number of pixels of the image displayed with said low resolution and the number of pixels of the image displayed with said high resolution are equal.

19. The image display apparatus according to claim 17, wherein said image plane includes a cathode ray tube.

20. The image display apparatus according to claim 17, wherein said image plane includes a liquid crystal display panel.

21. The image display apparatus according to claim 17, wherein said brightness changing means includes manual setting means for manually setting the ratio of the average brightness, automatic setting means for automatically setting the ratio of the average brightness, and selecting means for selecting either said manual setting means or said automatic setting means.

22. The image display system according to claim 17, wherein the image plane is capable of displaying images at a variety of image pixel densities at a constant level of magnification.

23. An image display apparatus comprising:
an image plane provided for displaying an image, said image plane being capable of displaying images at a variety of image pixel densities,
low resolution image display means for displaying an image on said image plane with low resolution in a first image pixel density; and
high resolution image display means for displaying an image of a particular region in said image plane with a resolution level higher than the resolution level of said low resolution in a second image pixel density higher than the first image pixel density, wherein,
on said image plane, a first quantity of light irradiated from a part corresponding to one pixel of the image displayed by said low resolution image display means differs from a second quantity of light irradiated from a part corresponding to one pixel of the image displayed by said high resolution image display means.

24. The image display apparatus according to claim 23, wherein a quantity of light obtained by multiplying the number of pixels, which are displayed by said low resolution image display means included in an image plane having an area, by said first quantity of light is equal to a quantity of light obtained by multiplying the number of pixels, which are displayed by said high resolution image display means included in an image plane having the same area as said area, by said second quantity of light.

25. The image display system according to claim 23, wherein the image plane is capable of displaying images at a variety of image pixel densities at a constant level of magnification.

26. An image display apparatus, comprising:
an image plane provided for displaying an image, said image plane being capable of displaying images at a variety of image pixel densities,
low resolution image display means for displaying an image on said image plane with low resolution in a first image pixel density; and
high resolution image display means for displaying an image of a particular region in said image plane with a resolution level higher than the resolution level of said low resolution in a second image pixel density higher than the first image pixel density, wherein
the average brightness of the image displayed with said high resolution differs from the average brightness of the image displayed with said low resolution.

27. The image display system according to claim 26, wherein the image plane is capable of displaying images at a variety of image pixel densities at a constant level of magnification.

28. An image display apparatus, comprising:
first output means for outputting first image data;
second output means for outputting second image data;
image display means for displaying a first image corresponding to said outputted first image data and a second image corresponding to said outputted second image data simultaneously in one image plane, said image display means being capable of displaying images at a variety of image pixel densities; and
brightness control means for controlling said image display means so that the average brightness of said first image displayed by said image display means differs from the average brightness of said second image displayed by said image display means.

29. The image display system according to claim 28, wherein the image plane is capable of displaying images at a variety of image pixel densities at a constant level of magnification.

30. An image display apparatus, comprising:
first output means for outputting first image data;
second output means for outputting second image data;
image display means for displaying a first image corresponding to said outputted first image data and a second image corresponding to said outputted second image data simultaneously in one plane, said image display means being capable of displaying images at a variety of image pixel densities; and
brightness adjusting means for changing the ratio of the average brightness of said first image displayed by said image display means to the average brightness of said second image displayed by said image display means.

31. The image display system according to claim 30, wherein the image plane is capable of displaying images at a variety of image pixel densities at a constant level of magnification.

32. Image display apparatus, comprising:
image display means for displaying an image on the basis of image data, said image display means being capable of displaying images at a variety of image pixel densities;
region designating means for designating an arbitrary region included in the image displayed by said image display means; and
brightness control means for controlling said image display means so that the average brightness of said displayed image in the region designated by said region designating means differs from the average brightness of said displayed image in another region.

33. The image display apparatus according to claim 32, wherein said brightness control means controls said image display means so that the average brightness of said designated region is higher than the average brightness of said another region.

34. The image display system according to claim 32, wherein the image plane is capable of displaying images at a variety of image pixel densities at a constant level of magnification.

35. A method of displaying an image on an image plane, said image plane being capable of displaying images at a variety of image pixel densities, comprising the steps of:
displaying a first part of said image on said image plane with a predetermined resolution with a predetermined image pixel density; and
displaying a second part of said image on said image plane with a level of resolution that is higher than said predetermined resolution with an image pixel density higher than the predetermined image pixel density without magnifying it.

36. The method of claim 35, further comprising the steps of designating the first and second parts of said image.

37. An image display system, comprising:

an image plane on which an image is displayed, said image plane being capable of displaying images at a variety of image pixel densities;

first memory for storing image data inputted from an external device;

compressing means for compressing image data stored in said first memory;

second memory for storing image data compressed by said compressing means;

first display means for displaying an image based on image data stored in said second memory on said image plane in a predetermined image pixel density;

designating means for designating a region in the image displayed by said first display means; and second display means for displaying an image in the region designated by said designating means in an image pixel density higher than the predetermined image pixel density based on image data which is stored in said first memory and corresponds to the region.

38. The image display system according to claim 37, wherein the image plane is capable of displaying images at a variety of image pixel densities at a constant level of magnification.

* * * * *